United States Patent
Pan et al.

(10) Patent No.: US 12,417,343 B2
(45) Date of Patent: Sep. 16, 2025

(54) CALLING A PLUGIN AND USING A MERGING POLICY FOR MITIGATING VERSION CONFLICTS

(71) Applicant: International Business Machines Corporation, Armonk, NY (US)

(72) Inventors: Lei Pan, Mountain View, CA (US); Vasily Tarasov, Moorpark, CA (US); Frank Schmuck, Campbell, CA (US); Marc Eshel, Santa Clara, CA (US); Jeremy Andrew Cohn, Tucson, AZ (US); D Scott Guthridge, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 188 days.

(21) Appl. No.: 18/522,005

(22) Filed: Nov. 28, 2023

(65) Prior Publication Data

US 2025/0173504 A1    May 29, 2025

(51) Int. Cl.
*G06F 40/197*    (2020.01)
*G06F 16/178*    (2019.01)
*G06F 9/445*    (2018.01)

(52) U.S. Cl.
CPC .......... *G06F 40/197* (2020.01); *G06F 16/178* (2019.01); *G06F 9/44526* (2013.01)

(58) Field of Classification Search
None
See application file for complete search history.

(56) References Cited

U.S. PATENT DOCUMENTS

| 6,393,434 B1 | 5/2002 | Huang et al. |
| 7,584,186 B2 | 9/2009 | Chen et al. |
| 8,965,840 B2 | 2/2015 | Hagan et al. |

(Continued)

FOREIGN PATENT DOCUMENTS

| CN | 105183789 A | 12/2015 |
| CN | 106230774 A | 12/2016 |
| CN | 109670151 A | 4/2019 |

OTHER PUBLICATIONS

IBM, "Caching modes," IBM Storage Scale, Mar. 2, 2021, 3 pages, retrieved from https://www.ibm.com/docs/en/spectrumscale/4.2.0?topic=management-caching-modes.

(Continued)

*Primary Examiner* — Toan H Vu
(74) *Attorney, Agent, or Firm* — Zilka-Kotab, P.C.

(57) ABSTRACT

A computer-implemented method, according to one approach, includes performing a predetermined first data merge process in response to a determination that a version conflict exists between a plurality of versions of a data file resulting from editing performed on different cloud devices. The predetermined first data merge process includes determining a first merging policy of the data file from a plurality of potential merging policies, determining a plugin associated with the data file, and calling the plugin. The first merging policy is used as an input for the plugin, and the plugin includes predetermined conditions for determining first contents of the versions of the data file to exclude from a merge operation performed on the data file and second contents of the versions of the data file to include in the merge operation.

20 Claims, 13 Drawing Sheets

(56) References Cited

U.S. PATENT DOCUMENTS

| | | | | |
|---|---|---|---|---|
| 9,560,130 | B2* | 1/2017 | Mantri | G06F 16/2365 |
| 9,760,862 | B2 | 9/2017 | Bailor et al. | |
| 11,650,959 | B2 | 5/2023 | Wijayaratne et al. | |
| 11,868,800 | B1* | 1/2024 | Singh | G06F 8/65 |
| 11,880,650 | B1* | 1/2024 | Li | G06F 40/174 |
| 2006/0106889 | A1* | 5/2006 | Mannby | G06F 16/1873 |
| | | | | 707/999.203 |
| 2008/0140732 | A1* | 6/2008 | Wilson | G06F 16/1873 |
| 2019/0014167 | A1* | 1/2019 | Rao | G06F 16/176 |
| 2019/0121876 | A1* | 4/2019 | Do | G06F 16/152 |
| 2020/0151226 | A1* | 5/2020 | Blumenfeld | G06F 16/9577 |
| 2023/0359814 | A1* | 11/2023 | Blumenfeld | G06F 9/547 |

OTHER PUBLICATIONS

Box Support, "File Version Conflicts," Feb. 26, 2020, 7 pages, retrieved from https://support.box.com/hc/en-us/articles/360044193873-File-Version-Conflicts#.

Dropbox, "What's a conflicted copy?" Dropbox, 2023, 4 pages, retrieved from https://help.dropbox.com/organize/conflicted-copy.

Git, "3.2 Git Branching—Basic Branching and Merging," Git, 2023, 10 pages, retrieved from https://git-scm.com/book/en/v2/Git-Branching-Basic-Branching-and-Merging#_basic_merge_conflicts.

Files Merge, "Merge texts," Files Merge, 2023, 5 pages, retrieved from https://filesmerge.com/merge-text-files.

GroupDocs, "Free Online Document Manipulation Apps for Popular File Formats," GroupDocs, 2023, 13 pages, retrieved from https://products.groupdocs.app/.

AWS, "Using versioning in S3 buckets," Amazon Web Services, Inc., 2023, 3 pages, retrieved from https://docs.aws.amazon.com/AmazonS3/latest/userguide/Versioning.html.

IBM, "Caching modes," IBM Storage Scale, Mar. 2, 2021, 3 pages, retrieved from https://docs.aws.amazon.com/AmazonS3/latest/userguide/Versioning.html.

* cited by examiner

CALLING A PLUGIN AND USING A MERGING POLICY FOR MITIGATING VERSION CONFLICTS

BACKGROUND

The present invention relates to cloud-based environments, and more specifically, this invention relates to calling a plugin and using a merging policy as input for the plugin for mitigating version conflicts during merging.

Cloud computing includes a plurality of networked computer devices that are typically not managed by users. In some cloud deployments, a plurality of cloud devices have access to the same data. For example, in some deployments, while in an online state, the cloud devices are able to simultaneously access and edit the same data file version. However, in some other deployments, as a result of being in an offline state, the cloud devices may only be able to access different remote copies of the data file, and therefore edits of these different offline remote copies of the data file create different versions of the data file.

Cloud services typically remedy these different versions of the data file upon the cloud devices returning to the online state by performing data merge and synchronization operations. These data merge and synchronization operations use one or more of the different versions of the data file created by the cloud devices while in the offline state to establish an updated version of the data file. Data of the data file may be stored both in cloud, e.g., storage that is accessible by the cloud devices, and/or on-premise storage, e.g., memory of the cloud devices.

Some cloud deployments include a plurality of user devices, e.g., laptop computers, tablet computers, smart phones, smart watches, etc., that are each configured to access a data file. For example, consumer users may own multiple personal devices that they use as cloud devices to access a data file and therefore may perform data merge and synchronization operations between online and offline states. In another example, a company may own a plurality of work cloud devices that are used as cloud devices to modify company data files in offline and online states.

SUMMARY

A computer-implemented method, according to one approach, includes performing a predetermined first data merge process in response to a determination that a version conflict exists between a plurality of versions of a data file resulting from editing performed on different cloud devices. The predetermined first data merge process includes determining a first merging policy of the data file from a plurality of potential merging policies, determining a plugin associated with the data file, and calling the plugin. The first merging policy is used as an input for the plugin, and the plugin includes predetermined conditions for determining first contents of the versions of the data file to exclude from a merge operation performed on the data file and second contents of the versions of the data file to include in the merge operation.

The method described above mitigates version conflicts by preventing two versions of a data file from corrupting the data file when a request to save a plurality of versions of a data file is received. Specifically, the predetermined first data merge process that is performed in response to the determination that the version conflict exists between the plurality of versions of a data file, identifies contents (the first contents) that would otherwise cause corruption of the data file, and excludes these contents from the merge operation that is performed. It should be noted that these contents would have otherwise compromised performance of a cloud-based environment in that manual intervention would be needed to back the data file out to a previous functional state. Accordingly, the predetermined first data merge process maintains an operational state of a cloud-based environment in which the method is performed. Furthermore, by identifying the second contents of the versions of the data file to include in the merge operation, a refined set of the changes (the second contents) reflected in the versions of the versions of a data file resulting from editing performed on different cloud devices is determined. In addition, to maintain an operational state of a cloud-based environment, the method operations reduce an amount of storage operations that are performed because at least some of the contents of the versions of the data file are excluded from the merge operation.

In some approaches, the merge operation performed on the data file may include writing the second contents to the data file.

The merge operation has a technical benefit of fulfilling a request to save the versions of the data file. By the merge operation including the second contents to the data file rather than the first contents of the data file, processing resources, that would have otherwise been expended storing the first contents, are preserved.

In some approaches, the first merging policy may be a timing-based policy.

A technical benefit of the first merging policy being a timing-based policy includes relatively more recent changes being prioritized and included in the merge operation as opposed to relatively less recent changes being prioritized and included in the merge operation. An advantage of using a timing-based policy includes relatively more recent changes being ensured to be reflected in the data file, while relatively older changes, which may be outdated, are not prioritized.

A first of the predetermined conditions may prioritize the versions of the data file with relatively more recent changes over the versions of the data file with relatively less recent changes. Furthermore, calling the plugin may include including the versions of the data file with relatively more recent changes in the merge operation, and excluding the versions of the data file with relatively less recent changes from the merge operation.

A technical benefit of prioritizing the versions of the data file with relatively more recent changes over the versions of the data file with relatively less recent changes includes refining the contents of the versions of the data file that are ultimately incorporated into the data file by the merge operation. An advantage of prioritizing the versions of the data file with relatively more recent changes over the versions of the data file with relatively less recent changes includes relatively more recent changes being ensured to be reflected in the data file, while relatively older changes, which may be outdated, are not prioritized.

The first merging policy may, in some approaches, be a role-based policy based on a plurality of predetermined role priorities.

An overall technical benefit of having the first merging policy be a role-based policy based on a plurality of predetermined role priorities includes the contents of the data file that are generated by one having a relatively less prioritized role being excluded from the merge operation, while the contents of the data file that are generated by one having a relatively greater prioritized role are included in the merge operation. This prioritization eliminates the expenditure of processing resources that may otherwise have been performed in order to back out errors introduced into the data file as a result of contents of a version of the data file generated by a user and/or device having a relatively low priority role being prioritized.

In some approaches, a first of the predetermined conditions may prioritize the versions of the data file edited by the cloud devices associated with relatively higher role priorities over the versions of the data file edited by cloud devices associated with relatively lower role priorities. Determining the first merging policy may include determining the version of the data file edited by the cloud device associated with a relatively highest priority, and calling the plugin may include including the version of the data file edited by the cloud device associated with the relatively highest priority in the merge operation.

A general technical benefit of the first predetermined conditions described above includes ensuring that the refined contents of the data file versions that are incorporated into the merge operation include edits performed by cloud devices associated with relatively high role priorities. This way, a predetermined and/or dynamically adjusted structuring of cloud device role priorities is effectuated into the merge operation. Furthermore, by refining the contents of the data file versions that are incorporated into the merge operation, relatively less processing resources are expended while performing the merge operation.

In some approaches, roles of the predetermined role priorities may include root, administrator, user, and/or guest.

A general technical benefit of implementing the roles described above includes the enablement of a variety of different tiers of priority. This tiering is particularly useful for enabling a prioritization of data file versions where a plurality of different cloud devices used by users with different experience levels create different data file versions. By refining the contents of the data file versions that are incorporated into the merge operation, such as by prioritizing a version of the data file generated by a cloud device with a root role over a different version of the data file generated by a cloud device with a guest role, relatively less processing resources are expended while performing the merge operation.

In some approaches, determining the first merging policy may include determining a timestamp delta, where the timestamp delta is a timestamp difference of the versions of the data file. Determining the first merging policy may additionally include comparing the timestamp delta with a predetermined timestamp threshold, where the first merging policy is determined to be a role-based policy in response to a determination, based on results of the comparing, that the timestamp delta is less than the predetermined timestamp threshold. The first merging policy may be determined to be a timing-based policy in response to a determination, based on the results of the comparing, that the timestamp delta is greater than the predetermined timestamp threshold.

The techniques described above for determining the first merging policy enable a dynamic determined merging policy that applies to a relatively wide perspective of scenarios. More specifically, comparing the timestamp delta with the predetermined timestamp threshold presents two different potential merging policies.

In some approaches, the computer-implemented method additionally or alternatively includes receiving a request to save the versions of the data file resulting from the editing performed on the different cloud devices, and causing the versions of the data file to be stored on a predetermined storage device.

Storing the versions of the data file to be stored on a predetermined storage device ensures that the versions can be accessed and inspected at a relatively closer level thereafter. Furthermore, because the versions of the data file are caused to be stored on the predetermined storage device in response to receiving the request to do so, a storage potential of the predetermined storage device is consumed on a request basis. This preserves the storage potential in cases in which such a request is not received.

A computer program product, according to another approach, includes a computer readable storage medium having program instructions embodied therewith. The program instructions are readable and/or executable by a computer to cause the computer to perform any combination of features of the foregoing methodology. Similar technical effects are obtained.

A system, according to another approach, includes a processor, and logic integrated with the processor, executable by the processor, or integrated with and executable by the processor. The logic is configured to perform any combination of features of the foregoing methodology. Similar technical effects are obtained.

In one preferred approach, a computer-implemented method includes performing a predetermined first data merge process in response to a determination that a version conflict exists between a plurality of versions of a data file resulting from editing performed on different cloud devices. The predetermined first data merge process includes determining a first merging policy of the data file from a plurality of potential merging policies. Determining the first merging policy may include determining a timestamp delta, where the timestamp delta is a timestamp difference of the versions of the data file. Determining the first merging policy may additionally include comparing the timestamp delta with a predetermined timestamp threshold, where the first merging policy may be determined to be a role-based policy in response to a determination, based on results of the comparing, that the timestamp delta is less than the predetermined timestamp threshold. In contrast, the first merging policy may be determined to be a timing-based policy in response to a determination, based on the results of the comparing, that the timestamp delta is greater than the predetermined timestamp threshold. The predetermined first data merge process additionally includes, determining a plugin associated with the data file, and calling the plugin. The first merging policy is used as an input for the plugin, and the plugin includes predetermined conditions for determining first contents of the versions of the data file to exclude from a merge operation performed on the data file and second contents of the versions of the data file to include in the merge operation.

The method described above mitigates version conflicts by preventing two versions of a data file from corrupting the data file when a request to save a plurality of versions of a data file is received. In doing so, these techniques for determining the first merging policy offer a dynamic determined merging policy that applies to a relatively wide perspective of scenarios. Regardless of the merging policy that is determined, the merging policy identifies contents (the first contents) that would otherwise cause corruption of the data file, and excludes these contents from the merge operation that is performed. It should be noted that these contents would have otherwise compromised performance of a cloud-based environment in that manual intervention would be needed to back the data file out to a previous functional state. Accordingly, the predetermined first data merge process maintains an operational state of a cloud-based environment in which the method is performed. Furthermore, by identifying the second contents of the versions of the data file to include in the merge operation, a refined set of the changes (the second contents) reflected in the versions of the versions of a data file resulting from editing performed on different cloud devices is determined.

In the preferred approach described above, in response to a determination, based on the results of the comparing, that the timestamp delta is greater than the predetermined timestamp threshold, a relevant use case of the preferred approach described above includes an environment in which cloud devices are used to perform a series of edits over time. For example, a series of edits to the data file may be performed using the cloud devices as members of a team using the cloud devices discuss a context of the edits over the series of edits. These edits may be performed over time based on, e.g., different time zones, different devices being allotted different editing times, etc. In this use case, the relatively most recently performed edits that establish a version of the data file having a relatively most recently obtained timestamp may be the version of the data file that is selected by the timing-based merging policy for incorporating into the data file in the merge operation. The version of the data file having a relatively most recently obtained timestamp may be preferred and useful because the version of the data file likely accurately reflects and incorporates a most recently performed collaboration and/or relatively most recently conducted discussions of the team.

Another use case of the preferred approach above encompasses scenarios in which the timestamp delta is less than the predetermined timestamp threshold and therefore the first merging policy is determined to be a role-based policy. In these scenarios, a use case includes cloud devices being used by employees of a company, and versions of the data file that include edits performed on cloud devices by employees having relatively higher roles (such as based on work experience, work responsibilities, company leadership positions, etc.) being prioritized over versions of the data file that include edits performed on cloud devices by employees having relatively lower roles (such as based on limited work experience, minimal work responsibilities, lack of company leadership positions, etc.).

Other aspects and approaches of the present invention will become apparent from the following detailed description, which, when taken in conjunction with the drawings, illustrate by way of example the principles of the invention.

DETAILED DESCRIPTION

Figure 1:
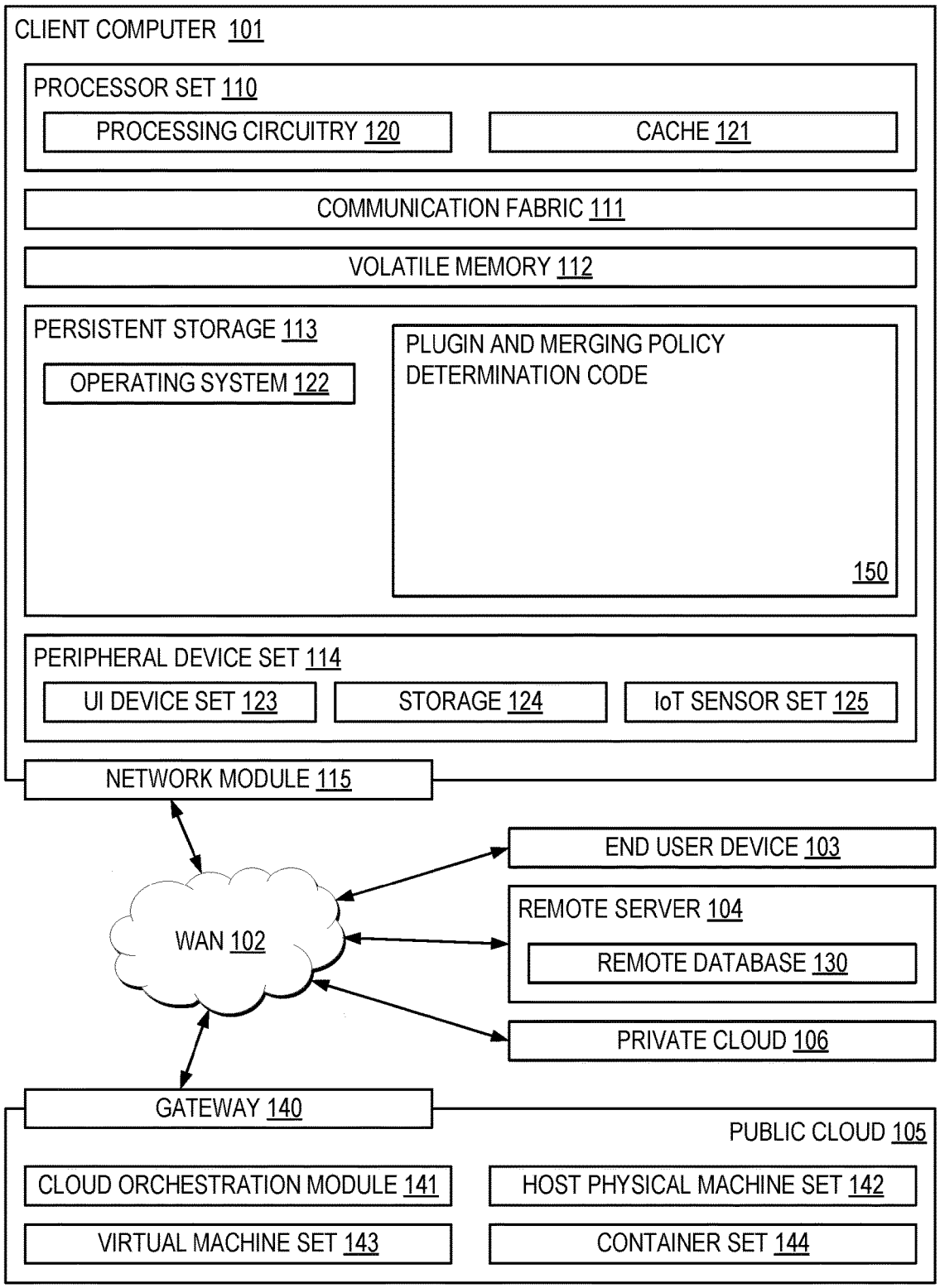
FIG. 1 is a diagram of a computing environment, in accordance with one approach of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for calling a plugin and using a merging policy as input for the plugin for mitigating version conflicts.

In one general approach, a computer-implemented method includes performing a predetermined first data merge process in response to a determination that a version conflict exists between a plurality of versions of a data file resulting from editing performed on different cloud devices. The predetermined first data merge process includes determining a first merging policy of the data file from a plurality of potential merging policies, determining a plugin associated with the data file, and calling the plugin. The first merging policy is used as an input for the plugin, and the plugin includes predetermined conditions for determining first contents of the versions of the data file to exclude from a merge operation performed on the data file and second contents of the versions of the data file to include in the merge operation.

In another general approach, a computer program product includes a computer readable storage medium having program instructions embodied therewith. The program instructions are readable and/or executable by a computer to cause the computer to perform any combination of features of the foregoing methodology.

In another general approach, a system includes a processor, and logic integrated with the processor, executable by the processor, or integrated with and executable by the processor. The logic is configured to perform any combination of features of the foregoing methodology.

Various aspects of the present disclosure are described by narrative text, flowcharts, block diagrams of computer systems and/or block diagrams of the machine logic included in computer program product (CPP) approaches. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product approach ("CPP approach" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as plugin and merging policy determination code of block 150 for calling a plugin and using a merging policy as input for the plugin for mitigating version conflicts. In addition to block 150, computing environment 100 includes, for example, computer 101, wide area network (WAN) 102, end user device (EUD) 103, remote server 104, public cloud 105, and private cloud 106. In this approach, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various approaches, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some approaches, storage 124 may take the form of a quantum computing storage device for storing data in the form of qubits. In approaches where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some approaches, network control functions and network forwarding functions of network module 115 are performed on the same physical hardware device. In other approaches (for example, approaches that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some approaches, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some approaches, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other approaches a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this approach, public cloud 105 and private cloud 106 are both part of a larger hybrid cloud.

In some aspects, a system according to various approaches may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

Figure 2:
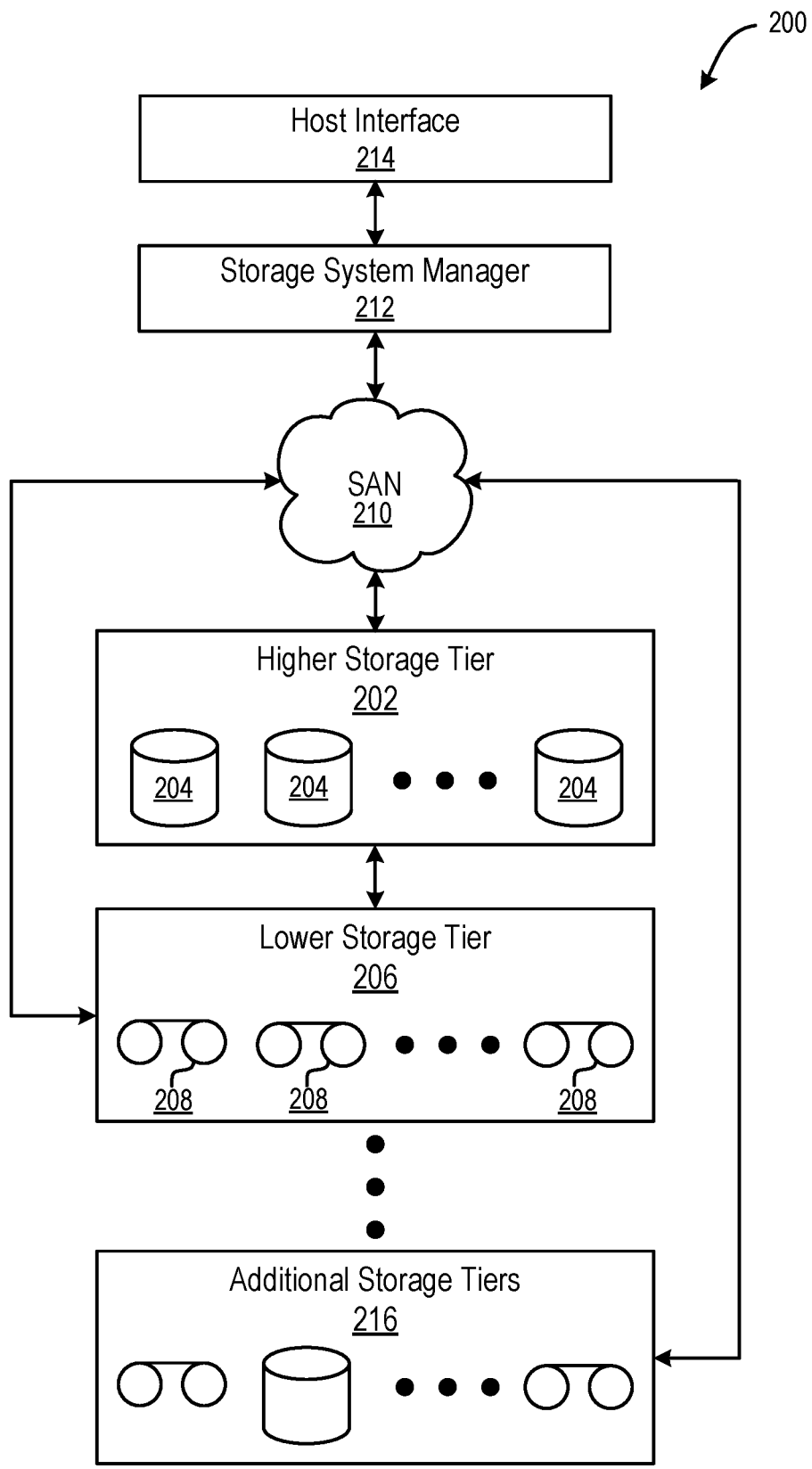
FIG. 2 is a diagram of a tiered data storage system, in accordance with one approach of the present invention.

Now referring to FIG. 2, a storage system 200 is shown according to one approach. Note that some of the elements shown in FIG. 2 may be implemented as hardware and/or software, according to various approaches. The storage system 200 may include a storage system manager 212 for communicating with a plurality of media and/or drives on at least one higher storage tier 202 and at least one lower storage tier 206. The higher storage tier(s) 202 preferably may include one or more random access and/or direct access media 204, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 206 may preferably include one or more lower performing storage media 208, including sequential access media such as magnetic tape in tape drives and/or optical media, slower accessing HDDs, slower accessing SSDs, etc., and/or others noted herein or known in the art. One or more additional storage tiers 216 may include any combination of storage memory media as desired by a designer of the system 200. Also, any of the higher storage tiers 202 and/or the lower storage tiers 206 may include some combination of storage devices and/or storage media.

The storage system manager 212 may communicate with the drives and/or storage media 204, 208 on the higher storage tier(s) 202 and lower storage tier(s) 206 through a network 210, such as a SAN, as shown in FIG. 2, Internet Protocol (IP) network, or some other suitable network type. The storage system manager 212 may also communicate with one or more host systems (not shown) through a host interface 214, which may or may not be a part of the storage system manager 212. The storage system manager 212 and/or any other component of the storage system 200 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more approaches, the storage system 200 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 202, may include a majority of SSD storage media for storing data in a higher performing storage environment, and remaining storage tiers, including lower storage tier 206 and additional storage tiers 216 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 202, while data not having one of these attributes may be stored to the additional storage tiers 216, including lower storage tier 206. Of course, one of skill in the art, upon reading the present descriptions, may devise many other combinations of storage media types to implement into different storage schemes, according to the approaches presented herein.

According to some approaches, the storage system (such as 200) may include logic configured to receive a request to open a data set, logic configured to determine if the requested data set is stored to a lower storage tier 206 of a tiered data storage system 200 in multiple associated portions, logic configured to move each associated portion of the requested data set to a higher storage tier 202 of the tiered data storage system 200, and logic configured to assemble the requested data set on the higher storage tier 202 of the tiered data storage system 200 from the associated portions.

As mentioned elsewhere above, cloud computing includes a plurality of networked computer devices that are typically not managed by users. In some cloud deployments, a plurality of cloud devices have access to the same data. For example, in some deployments, while in an online state, the cloud devices are able to simultaneously access and edit the same data file version. However, in some other deployments, as a result of being in an offline state, the cloud devices may only be able to access different remote copies of the data file, and therefore edits of these different offline remote copies of the data file create different versions of the data file.

Cloud services typically remedy these different versions of the data file upon the cloud devices returning to the online state by performing data merge and synchronization operations. These data merge and synchronization operations use one or more of the different versions of the data file created by the cloud devices while in the offline state to establish an updated version of the data file. Data of the data file may be stored both in cloud, e.g., storage that is accessible by the cloud devices, and/or on-premises storage. For example, the on-premises storage may include a company's servers that are located within the organization's infrastructure. Data and other information may be shared between computers through a local network, rather than going through a public network.

Some cloud deployments include a plurality of user devices, e.g., laptop computers, tablet computers, smart phones, smart watches, etc., that are each configured to access a data file. For example, consumer users may own multiple personal devices that they use as cloud devices to access a data file and therefore may perform data merge and synchronization operations between online and offline states. In another example, a company may own a plurality of work cloud devices that are used as cloud devices to modify company data files in offline and online states.

Cloud devices being configured to modify data to establish a new version of a data file while in the offline state allow users to work on projects even while a network connection is not available, e.g., on an airline flight, during a network outage, etc. In other words, data can be modified offline and updated online later. In another example, within the field of edge computing, IoT (Internet of Things) devices may be connected and coordinate for data collection. IoT within this field may refer to devices such as cell phones, laptops, sensors, etc., and data collected by these IoT devices may be sent to a central server for further processing. Synchronization is the process of updating changes in files between two or more devices so the content remains consistent within systems. Although synchronization is useful for ensuring that changes made in an offline state are populated into the cloud, conventional synchronization techniques often experience version conflicts. For context, a version conflict, in some approaches, occurs when multiple user devices are used to edit the same file at the same time from different locations and/or the same location while in an offline state. The version conflicts originate with data being accessed (as local copies) and updated from different locations by different users while these cloud devices and/or IoT devices are in an offline state. Of course, these updates generate unique versions of data file that are not consistent across the different cloud devices. Inevitably, version conflicts arise due to multiple users and/or devices attempting to update a single file concurrently upon regaining access to the cloud network. More specifically, these devices returning to an online state (after having limited network connectivity) leads to a burst of conflicting file synchronization attempts during the same period. In some use cases, data is automatically and periodically collected by IoT devices, such as sensor nodes, and sent to a sever. Sensors with relatively close approximate ranges may collect information for the same object. In such a case, data sent by a primary sensor may be ensured to take precedence over data sent by a backup sensor in terms of merging. Furthermore, a merging algorithm that is used is configured to differentiate primary and secondary roles.

Administrators are sometimes relied upon in order to attempt to correct these inconsistent file contents. However, administrators rely on manual selection of file contents to incorporate into the updated version of a data file. There are several more issues that arise as a result of using an administrator to perform a manual intervention. For example, manual intervention by an administrator fails to consider a surrounding context of which contents of the data file have a relatively higher priority over other contents of the data file. Accordingly, manual intervention by such an administrator incorporates inconsistencies and errors in selections into a version of the data file that incorporates at least some of the offline changes. Furthermore, relying on human intervention to resolve a version conflict is a relatively costly and time consuming process, especially based on the tendency of files on edge nodes to increase in size relatively rapidly. Furthermore, manual intervention can only be attempted on certain file types, but not all. Another issue that arises from reliance on a manual intervention at an application level from an administrator is based on the fact that use of an administrator consumes storage resources and cloud network bandwidth. For example, conflict copies are often uploaded to and saved in cloud storage and/or on local storage. Furthermore, the new file that results from the updates includes all the conflicted contents. This at least temporarily corrupts the data file and renders the data file in an unusable state for at least the amount of time that an administrator takes to evaluate the conflicting contents. Attachment of conflicting data to the existing file without content checking also leads to data duplication, and the duplicated data may not even be data that is preserved in the manual intervention. Storage resources and processing potential within the cloud network is wasted in the processing and storage of this duplicated data. For at least the issues described above, conventional cloud networks have a long-standing need for techniques that provide a generic and automated data merge algorithm to relatively reduce the overhead associated with merging data generated by different cloud devices between offline and online states.

Figure 3A:
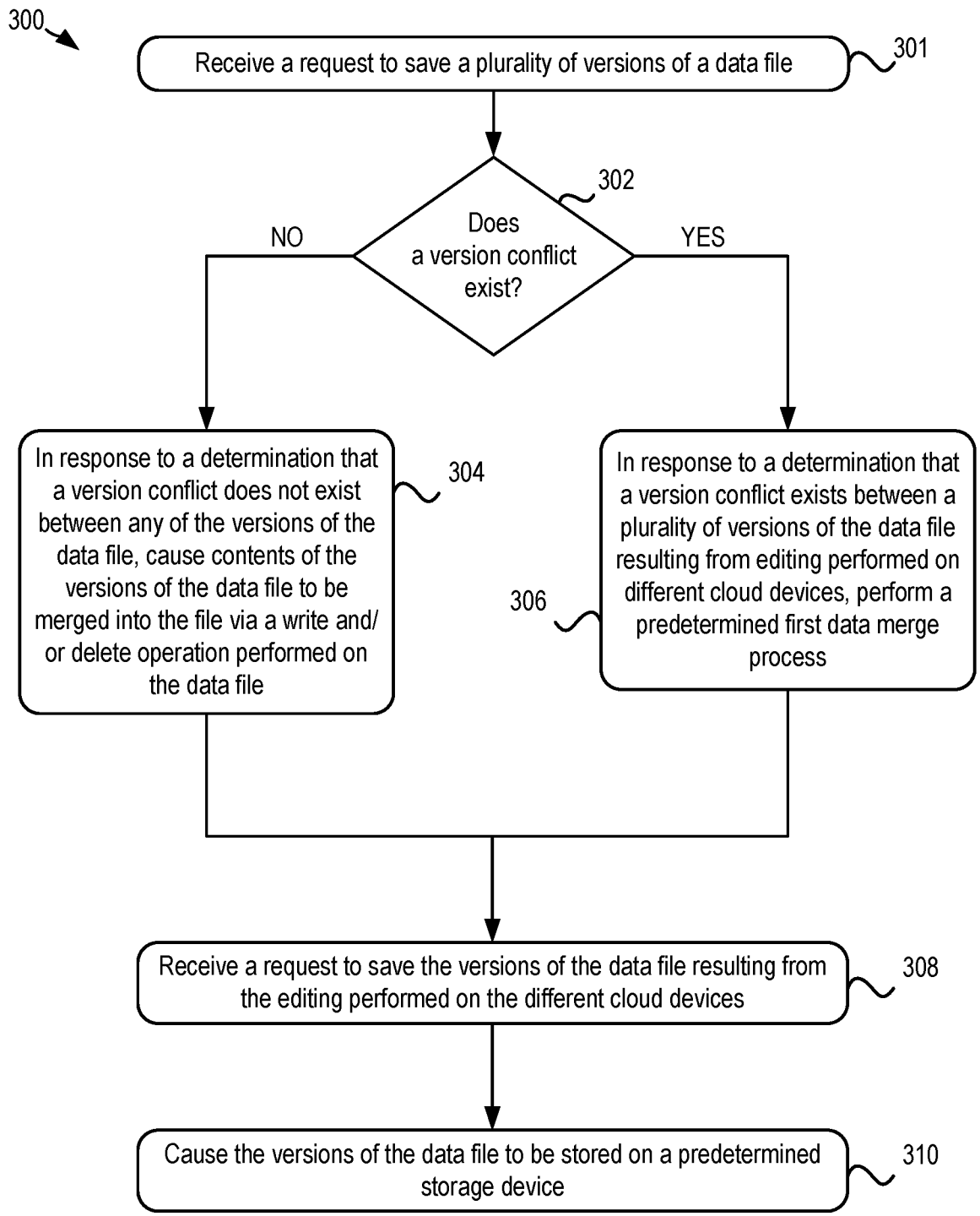
FIG. 3A is a flowchart of a method, in accordance with one approach of the present invention.

Now referring to FIG. 3A, a flowchart of a method 300 is shown according to one approach. The method 300 may be performed in accordance with the present invention in any of the environments depicted in FIGS. 1-7, among others, in various approaches. Of course, more or fewer operations than those specifically described in FIG. 3A may be included in method 300, as would be understood by one of skill in the art upon reading the present descriptions.

Each of the steps of the method 300 may be performed by any suitable component of the operating environment. For example, in various approaches, the method 300 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

It may be prefaced that method 300 may, in some preferred approaches, be performed in a cloud-based environment that includes a plurality of cloud devices that have access to the same data, e.g., at least a data file. For example, while in an online state in which the cloud devices are connected to a network within the cloud-based environment, the cloud devices are preferably able to simultaneously access and potentially edit the data file. In contrast, in some approaches, as one or more of the cloud devices at least temporarily entering into an offline state, the one or more cloud devices may only be able to access different remote copies of the data file. As one or more of the cloud devices edit these remote copies of the data file while in the remote state, unique versions of the data file are created. Upon thereafter entering back into the online state, these cloud devices are preferably configured to upload these versions of the data file to a predetermined management component of a filesystem that includes the data file. For example, in some preferred approaches, the management component is a synchronization server and/or computer on which the data file is stored. In some other approaches, the management component is a controller that is configured to control one or more predetermined logical and/or physical memory locations that include data that is accessible to the cloud devices while the cloud devices are in the online state. The management component may, in some other approaches, be one of the cloud devices described herein that performs edits to a data file. For example, in one or more of such approaches the cloud device may be configured to compare a version of the data file edited by the cloud device to at least a second version of the data file edited by a second cloud device to determine which contents to incorporate in a merge operation. In some approaches, in which the management component is a cloud device, the cloud device may be configured to perform a remote access on another of the cloud devices in order to make such a comparison, and furthermore may be configured to cause, e.g., perform or instruct, an upload of contents to be performed to the data file. Such approaches may reduce an amount of processing that is expended on uploading versions of the data file. Accordingly, in some approaches, the operations of method 300 may be performed by such a management component.

Operation 301 includes receiving a request to save a plurality of versions of a data file. In some approaches, a plurality of requests may be received from different devices that have modified a data file to create new versions of the data file. Because these versions of the data file, which may be created by different cloud devices, may include unique contents, at least some of the version of the data file that are uploaded by the cloud devices may conflict with one another, thereby creating a version conflict. For context, the version conflict may be defined as a situation in which two or more versions of a data file that are in the process of being uploaded having at least some conflicts that conflict with one another. More specifically, conflicting contents may be defined as edits of content on a first version of the data file including different edits than edits of the same content of the data file on a second version of the data file. These differences may, in some approaches, include the first version including deletions to the content while the second version maintains and/or adds to the content. In some other approaches, these differences may additionally and/or alternatively include the first version including additions to the content that are different than additions to the same content in the second version, etc. Accordingly, in some approaches, method 300 includes determining whether a version conflict exists, e.g., see decision 302.

Although some approaches above detail that the determination may be performed in response to receiving request(s) to save versions of the data file, in some other approaches, the determination of whether a version conflict exists may be performed in response to a determination that more than one version of the data file is received and/or determined to be in the process of being uploaded to the data file. In some other approaches, the determination of whether a version conflict exists may additionally and/or alternatively be performed in response to a determination that more than one of the cloud devices of the cloud-based environment have returned to and/or entered an online state within the cloud-based environment subsequently and have versions of the data file that were generated while the cloud devices were in the offline state.

Comparison techniques of a type that would become apparent to one of ordinary skill in the art after reading the descriptions herein may be used to determine whether a version conflict exists between two or more versions of the data file. For example, in some approaches, these comparison techniques may include performing a comparison of results of natural language processing operations performed on each of the versions of the data file, e.g., where the data file includes at least some text-based content. In some other approaches, the data file may additionally and/or alternatively include at least some image-based content. In one or more of such approaches, the comparison techniques may include performing an image to image comparison for determining whether content of the different images of the versions of the data file differ from one another. In some other approaches, the comparison techniques may include performing a binary comparison and/or a hash comparison for determining whether content of the different versions of the data file differ from one another.

A version conflict may be determined to exist in response to a determination, based on results of performing the comparison techniques described above, that the content of the versions of the data file have been edited differently, e.g., see the "YES" logical path of decision 302. In contrast, in response to a determination, based on results of performing the comparison techniques described above, that the contents of the versions of the data file have not been edited differently, a version conflict is determined to not exist, e.g., see the "NO" logical path of decision 302. This may, in some approaches, be determined, e.g., based on the different versions of the data file having a different size, a determined change in the data file size, etc. For context, in some preferred approaches, any determined difference of the versions of the data file constitutes a version conflict, and in contrast, the two versions being identical constitutes no version conflict existing. Performance benefits are enabled as a result of determining whether the version conflict exists before performing any merging of one or more versions of the data file into the data file. More specifically, in response to a determination that a version conflict is determined to not exist, further processing operations associated with determining whether to allow a version of the data file to be incorporated into the data file may no longer be performed. Instead, in response to a determination that a version conflict does not exist between any of the versions of the data file, method 300 includes causing contents of the versions of the data file to be merged into the data file via a write and/or delete operation performed on the data file, e.g., see operation 304. In other words, changes of each of the versions of the data file may, in some approaches, be populated into the data file that is accessible to all of the cloud devices. Techniques that would become apparent to one of ordinary skill in the art after reading the descriptions herein may be used to cause the changes to be populated into the data file.

In response to a determination that a version conflict exists between a plurality of versions of a data file resulting from editing performed on different cloud devices, method 300, in some approaches, includes performing a predetermined first data merge process, e.g., see operation 306. Note that although a first data merge process is described herein, in some other approaches, one or more additional data merge processes may be performed for additional versions of the same data file and/or different data files. For context, in some preferred approaches, the predetermined first data merge process ensures that processing resources are not expended on incorporating conflicting contents of a plurality of versions of the data file into the data file. Incorporating conflicting contents of different versions of the data file into the data without the techniques for merging described in approaches herein would otherwise introduce latency into the cloud-based environment because processing resources would be expended to add contents into the data file that would thereafter need to be manually removed in order to mitigate the conflicts. Preferred approaches for performing the predetermined first data merge process are described below, e.g., see FIG. 3B.

Figure 3B:
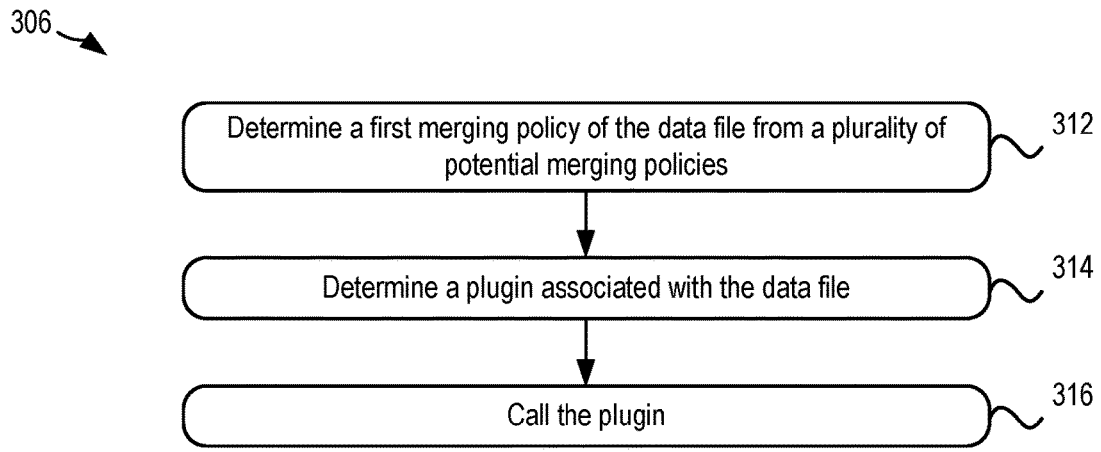
FIG. 3B is a flowchart of sub-operations of an operation of FIG. 3A, in accordance with one approach of the present invention.

Looking to FIG. 3B, exemplary sub-operations of performing a predetermined first data merge process are illustrated in accordance with one approach, one or more of which may be used to perform operation 306 of FIG. 3A. However, it should be noted that the sub-operations of FIG. 3B are illustrated in accordance with one approach which is in no way intended to limit the invention.

An optional operation of the flowchart of FIG. 3B includes determining a file type of the data file. In some examples, an illustrative file type includes a text file. In some other approaches, the file type may additionally and/or alternatively be an image file. In yet another approach, the file type may be a presentation slide document. Other types of files that would become apparent to one of ordinary skill in the art after reading the descriptions herein may be used. For context, the file type may, in some approaches, be determined in order to determine a plugin to call and/or an automated merging policy to apply as input to a called plugin to mitigate the conflicting versions of the data file. For example, sub-operation 312 includes determining a first merging policy associated with the data file from a plurality of potential merging policies. For example, in some approaches, different files may each be pre-associated with a merging policy. For example, these pre-associations may be listed in a predetermined table that is accessed in order to determine the first merging policy. An illustrative example of the pre-associations may include a text file being pre-associated with a timing-based policy. In yet another approach, the pre-associations may additionally and/or alternatively include an image file being pre-associated with a role-based policy. In another approach, the first merging policy may additionally and/or alternatively be determined from the predetermined table as described above and passed to the merge plugin as a parameter. A plugin library includes a plurality of potential plugins that are each associated with a different file type.

Figure 3C:
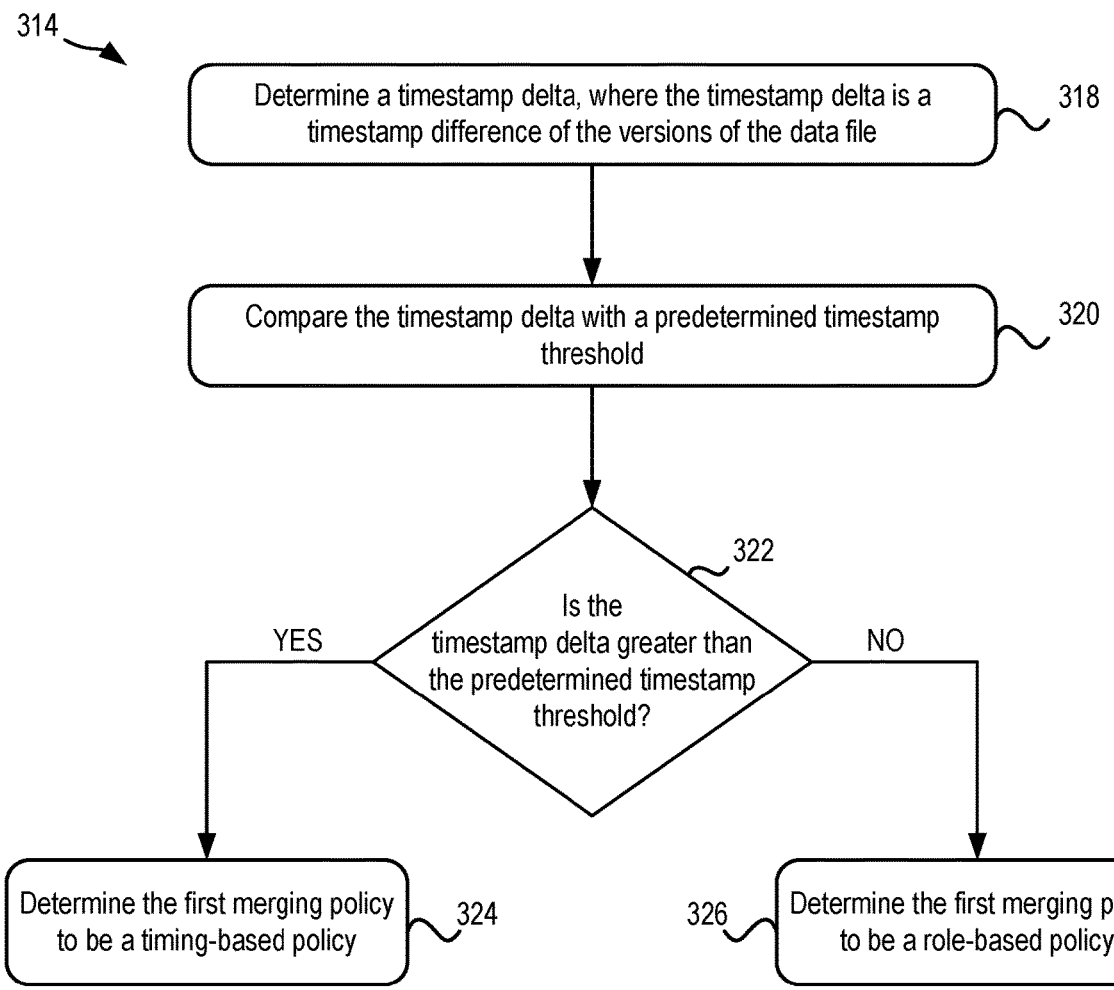
FIG. 3C is a flowchart of sub-operations of a sub-operation of FIG. 3B, in accordance with one approach of the present invention.

Looking to FIG. 3C, exemplary sub-operations of determining a first merging policy associated with the data file, from a plurality of potential merging policies are illustrated in accordance with one approach, one or more of which may be used to perform sub-operation 314 of FIG. 3B. However, it should be noted that the sub-operations of FIG. 3C are illustrated in accordance with one approach which is in no way intended to limit the invention.

It should be prefaced that, in some approaches, the merging policy is pre-associated with a given data file, e.g., based on received user configurations. Accordingly, in some approaches, the techniques below may be used to determine which merging policy to pre-associate with a given data file. In contrast, in some other approaches, the merging policy that is to be applied to a given data file may be dynamically determined on the fly using the techniques described below subsequent to receiving the request to save the plurality of versions of a data file.

In some approaches, determining the first merging policy includes determining a timestamp delta, where the timestamp delta is a timestamp difference of the versions of the data file, e.g., see sub-operation 318. In some approaches, the timestamp delta is a difference of two versions of the data file that are determined to have conflicting contents. However, in some other approaches, the contents of more than two of the versions of the data file may conflict with one another. In some approaches, in the event that more than two versions of the data file are present, multiple iterations of comparisons may be performed, e.g., each considering two different versions of the data file.

The timestamp delta is, in some approaches, compared with a predetermined timestamp threshold, e.g., see sub-operation 320. The predetermined timestamp threshold is, in some approaches, a predetermined amount of time, which may be any amount of time that may be file specific and/or predefined by a user configuration. For example, the predetermined amount of time may be ten seconds in some approaches. In some other approaches, the predetermined amount of time may be one minute. In yet some other approaches, the predetermined amount of time may be ten minutes. The predetermined amount of time may, in some other approaches, be one hour. In yet some other approaches, the predetermined amount of time may be one day.

A determination may be made as to whether the timestamp delta is greater than the predetermined timestamp threshold, e.g., see sub-operation 322. The first merging policy may be determined to be a first type of policy in response to a determination, based on results of the comparing, that the timestamp delta is less than the predetermined timestamp threshold, e.g., see the "NO" logical path of sub-operation 322. In one preferred approach, the first type of policy is a role-based policy, e.g., see sub-operation 326. The first merging policy may, additionally and/or alternatively be determined to be a second type of policy in response to a determination, based on the results of the comparing, that the timestamp delta is greater than or equal to the predetermined timestamp threshold, e.g., see the "YES" logical path of sub-operation 322. In one preferred approach, the second type of policy is a timing-based policy, e.g., see sub-operation 324.

As indicated elsewhere above, e.g., see FIG. 3B, the first merging policy, in some preferred approaches, includes at least some predetermined conditions for determining first contents of the versions of the data file to exclude from a merge operation performed on the data file and second contents of the versions of the data file to include in the merge operation. These predetermined conditions preserve a processing potential of the management component that is performing method 300. For example, as a result of identifying the first contents of the versions of the data file, at least some data is ultimately excluded from the merge operation. Accordingly, processing resources that would otherwise be expended uploading and merging the first contents are preserved. Furthermore, this exclusion prevents conflicting versions of data from being added to the data file, which would otherwise corrupt the data file and likely lead to additional processing resources being consumed to revert the data file to an earlier version in order to remove the conflicting data from the data file. Manual intervention, which would otherwise introduce further delay, costs and errors into management of the data file, is also not needed as a result of the techniques described herein.

Illustrative examples of role-based policies and timing-based policies are described below.

The first merging policy may, in some approaches, be a timing-based policy. The timing-based policy may be a default policy, in some approaches. In one preferred approach, a first of the predetermined conditions prioritizes the versions of the data file with relatively more recent changes over the versions of the data file with relatively less recent changes. A timing-based merging policy may be particularly applicable in use cases where different cloud devices are used to perform a series of edits over time. For example, a series of edits to the data file may be performed using the cloud devices as members of a team using the cloud devices discuss a context of the edits over the series of edits. In this use case, the relatively most recently performed edits that establish a version of the data file having a relatively most recently obtained timestamp may be the version of the data file that is selected by the timing-based merging policy for incorporating into the data file in the merge operation.

In some other approaches, the first merging policy is a role-based policy based on a plurality of predetermined role priorities. In one or more of such approaches, the roles may each be associated with a different cloud device and/or a user associated with the cloud device. For example, the roles of the predetermined role priorities may include a root cloud device and/or a user associated therewith, in some approaches. In some other approaches, the predetermined role priorities may additionally and/or alternatively include an administrator cloud device and/or a user associated therewith. In yet some other approaches, the predetermined role priorities may additionally and/or alternatively include a user cloud device. Furthermore, in some other approaches, the predetermined role priorities may additionally and/or alternatively include a guest cloud device and/or a user associated therewith. In some preferred approaches, a priority of the predetermined role priorities may include, from a relatively highest priority to a relatively lowest priority: root, administrator, user, guest, and all others. A first of the predetermined conditions of the first merging policy may, in some approaches, prioritize the versions of the data file edited by the cloud devices associated with relatively higher role priorities over the versions of the data file edited by cloud devices associated with relatively lower role priorities. In one specific example, determining the first merging policy may include determining the version of the data file edited by the cloud device associated with a relatively highest priority, and selecting the determined version of the data file for the merge operation. Using a role-based policy for the first merging policy enables a relatively strong likelihood that the version of the data file that is merged into the data file includes the relatively most preferred edits. For context, this is because, for example, in a use case in which the cloud devices are used by employees of a company, versions that include edits performed on cloud devices by employees having relatively higher roles (such as based on work experience, work responsibilities, company leadership positions, etc.) are prioritized over versions that include edits performed on cloud devices by employees having relatively lower roles (such as based on limited work experience, minimal work responsibilities, lack of company leadership positions, etc.). In another use case, a plurality of IoT devices with sensors may be configured to collect data. A preferred policy in such a use case may include data collected by a predetermined primary sensor being preferred over data collected by the other sensors. Accordingly, the primary sensor may be granted an administrator privilege, and one or more other secondary sensors may be granted user or guest privileges.

Sub-operation 314 includes determining a plugin associated with the data file. For context, upon a framework of method 300 beginning, in some approaches, a plurality of plugins may be registered in a predetermined plugin library. Each data file and/or type of data file may have a plugin associated therewith. In some approaches, data files and/or data file type may be pre-associated with a given one of the plugins, and the pre-associations may be referred to in order to determine a plugin for the data file.

With reference again to FIG. 3B, sub-operation 316 includes calling the plugin. The merging policy may be called from a predetermined memory module that may include dynamic libraries of plugins associated with merging policies to load. In some preferred approaches, in order to cause the contents of at least one of the versions of the data file to be incorporated into the data file, the determined first merging policy is used as an input for the plugin. Techniques that would become apparent to one of ordinary skill in the art after reading the descriptions herein may be used to cause the first merging policy to be used as an input for the plugin. More specifically, in some approaches, the input for the plugin may include the data file versions and the first merging policy.

As mentioned above, the first merging policy is called for causing the contents of at least one of the versions to be incorporated into the data file. For example, as detailed elsewhere above, the first merging policy, in some approaches, includes predetermined conditions for determining first contents of the versions of the data file to exclude from a merge operation performed on the data file. These first contents of the versions of the data file to exclude from the merge operation performed on the data file may include contents of versions of the data file that are determined to not satisfy the predetermined conditions. In contrast, the predetermined conditions may additionally and/or alternatively be used for determining second contents of the versions of the data file to include in the merge operation. The second contents may, in some approaches, include contents of versions of the data file that are determined to satisfy the predetermined conditions.

To cause the second contents to be incorporated into the data file, in some approaches, the merge operation includes writing the second contents to the data file. For some approaches in which the first merging policy is a timing-based policy, calling the plugin may include including the versions of the data file with relatively more recent changes in the merge operation, and excluding the versions of the data file with relatively less recent changes from the merge operation. In other words, as a result of calling the plugin, the versions of the data file with relatively more recent changes are identified to be the second contents and are thereby included in the merge operation. Meanwhile, as a result of calling the plugin, the versions of the data file with relatively less recent changes are identified to be the first contents and are thereby excluded from the merge operation. For some other approaches in which the first merging policy is a role-based policy, calling the plugin may include including the version of the data file edited by the cloud device associated with the relatively highest priority in the merge operation.

In some approaches, as a result of calling the plugin and a first merging policy being used as an input for the plugin, the first contents are excluded from the merge operation and the second contents are included in the merge operation. Accordingly, the second contents which would have otherwise conflicted with the first contents are not incorporated into the data file, and corruption of the data file is avoided, e.g., the version conflict is mitigated. It should be noted that this corruption, e.g., inclusion of conflicting data edits in the data file and/or storage of conflicting versions of the data file upon the cloud devices returning to an online state, would have otherwise compromised performance of the cloud-based environment in that manual intervention would be needed to back the data file out to a previous functional state. Accordingly, the techniques described herein preserve processing resources, e.g., that would otherwise be expended attempting to recover the cloud-based environment, and preserve efficient functioning of a storage system that contains the data file and is accessed by the cloud devices.

It should be noted that, in some approaches, contents of the versions of the data file that do not conflict with one another may be merged into the data file in the merge operation that is performed as a result of calling the plugin. Accordingly, although in some approaches, method 300 includes comparing an entirety of the versions with one another to determine whether a version conflict exists, in some other approaches, method 300 may include dividing the versions of the data file into predetermined size portions for evaluating with respect to the operations and techniques of method 300 described herein. For example, in some approaches, each of the versions may evaluated with respect to paragraphs of the versions of the data file. In another approach, each of the versions may be evaluated with respect to sentences of the versions of the data file. In some other approaches, each of the versions may be evaluated with respect to pages of the versions of the data file. Furthermore, in some other approaches, each of the versions may be evaluated with respect to squares of image(s) of the versions of the data file. Accordingly, in some approaches, a plurality of data merge processes, e.g., a second merge process, a third merge process, a fourth merge process, etc., may be performed with respect to the different portions that are evaluated. This granularization of the versions of the data file enables portions of the versions of the data file that do not conflict, and other portions that satisfy predetermined conditions of the determined merging policy to be merged into the data file. Without such a granularization breakdown, at least some portions of the versions of the data file that do not conflict may not be incorporated into the data file. Furthermore, in some approaches, this division and evaluation of the versions of the data file into predetermined size portions may be dynamically performed depending on processing resources that are available on a management component. This ensures that evaluations are not performed to a granular extent that would otherwise cause a relatively significant delay in the normal operation of the cloud-based environment. Accordingly, in some approaches, a size of the portions that content of the versions is divided into and evaluated based on may be caused to be proportional to an amount of processing resources that are determined to be available on the management component that is performing the operations of method 300.

An output after the merge plugin is called may, in some approaches, include a bool success and an updated version of the data file. In some other approaches, an output of the merge plugin may include a failure, and the versions of the data file may be stored for troubleshooting purposes.

With reference again to FIG. 3A, in some approaches, method 300 includes receiving a request to save the versions of the data file resulting from the editing performed on the different cloud devices, e.g., see operation 308. In response to receiving such a request, in some approaches, method 300 includes causing the versions of the data file to be stored on a predetermined storage device, e.g., see operation 310. In some approaches, only the contents associated with the version conflict are saved to the predetermined storage device. In these approaches, only the contents associated with the version conflict are saved to the predetermined storage device because an assumption may be made that the contents that are not associated with the version conflict were incorporated into the data file as a result of calling the plugin. Saving these contents to the predetermined storage device allows for at least some of the merging policies to be thereafter adjusted, e.g., such as in response to role priorities changing, in response to a determination that the predetermined thresholds result in a loss of performance in the cloud-based environment, etc.

The techniques of method 300 described above deploy a content aware solution for mitigating a version conflict. For context, these techniques are content aware in that they include a framework in which the content of versions of a data file, e.g., same pages, slides, paragraphs, etc., is compared with the content of other versions of the data file, and content for including in an update to the data file is determined based on a determined merge policy. In addition to the advantages described elsewhere above, these techniques provide relatively better accuracy and a greater user experience because manual intervention, which would otherwise introduce delays, expenses and errors, is avoided. Accordingly, these techniques enable the accommodation of various user needs via offering a range of pre-defined policies for version conflict resolution. These automated file merging techniques are adaptive to the growing needs in edge computing, where both number of edge nodes, e.g., cloud devices, and number of files on an edge node tend to increase relatively rapidly, and also allow file merging to be addressed at the file system level. These techniques also provide a platform for file merge on storage, allowing various plugins to be developed without need to install various application software. In contrast, existing merging implementations are not automatic and do not provide the flexible user experience described herein.

In some optional approaches, method 300 may include dynamically switching between a content aware data merge process, e.g., see the first data merge process described above, and a content agnostic data merge process. For context, in the content agnostic data merge process, a full merge may be performed using the versions of the data file without checking the content. This may be performed at a framework level without calling a plugin.

Figure 4:
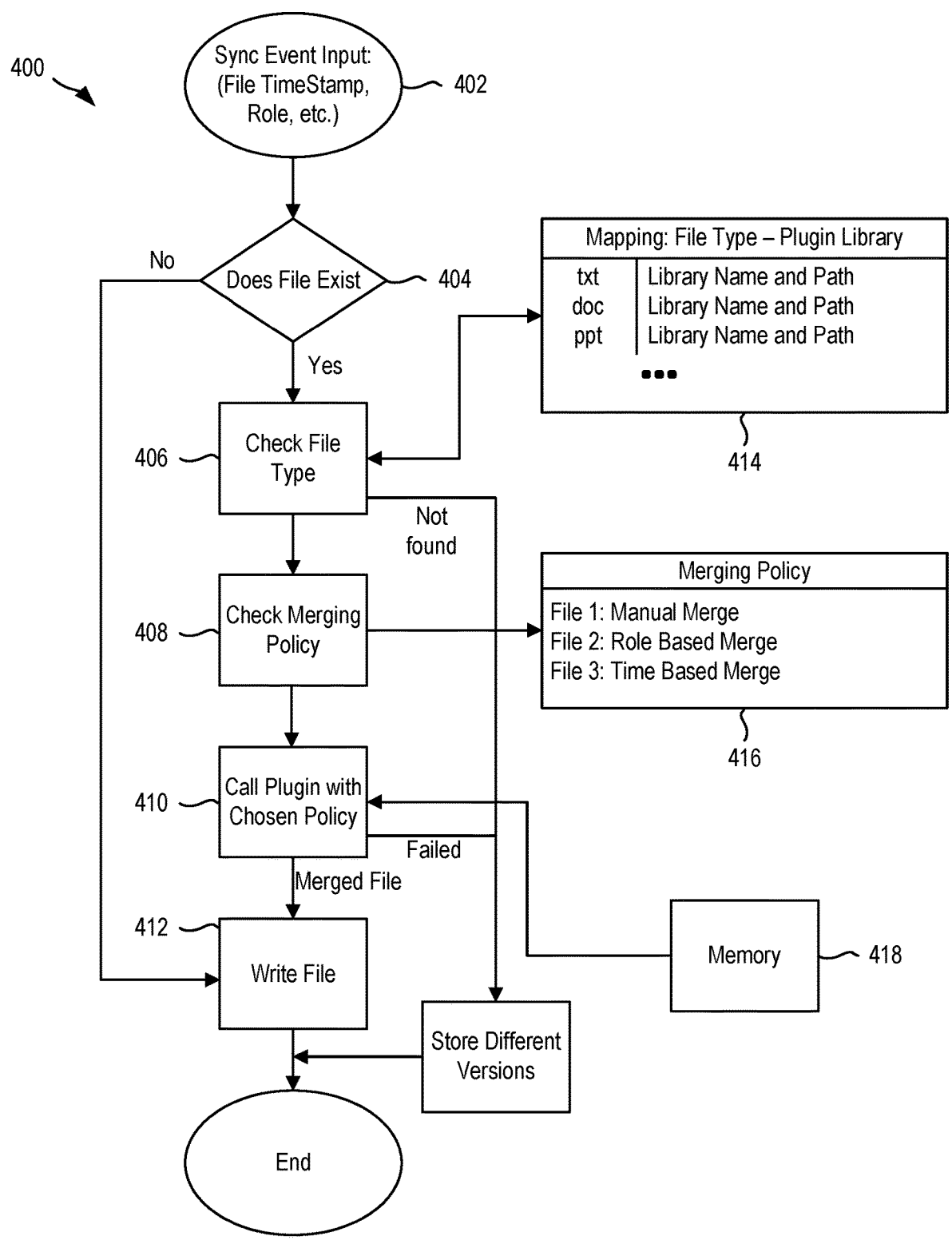
FIG. 4 is a flowchart of a method, in accordance with one approach of the present invention.

Now referring to FIG. 4, a flowchart of a method 400 is shown according to one approach. The method 400 may be performed in accordance with the present invention in any of the environments depicted in FIGS. 1-7, among others, in various approaches. Of course, more or fewer operations than those specifically described in FIG. 4 may be included in method 400, as would be understood by one of skill in the art upon reading the present descriptions.

Each of the steps of the method 400 may be performed by any suitable component of the operating environment. For example, in various approaches, the method 400 may be partially or entirely performed by a computer, or some other device having one or more processors therein. The processor, e.g., processing circuit(s), chip(s), and/or module(s) implemented in hardware and/or software, and preferably having at least one hardware component, may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

Method 400 describes operations that enable a framework for automated file merge and conflict resolution at a file system level. In some approaches, in order to enable this framework, merge plugin is registered for different file types as a shared library. For context, in some approaches, the plugin may be a third-party software. In some other approaches, the plugin may be written with customization. The plugin is preferably configured to take a user policy as a parameter and return a merged data file. Various operations for causing the merged data file to be returned are described in the operations of method 400 described below.

Operation 402 includes determining that a predetermined sync event has occurred. In some approaches, the predetermined sync event may be determined to have occurred based on a predetermined input being received, e.g., a file, a timestamp, a role, etc.

Decision 404 includes determining whether a version of a data file results from the predetermined sync event. In other words, a determination is made as to whether versions of a data file need to be merged with the data file. In response to a determination that no versions of the data file exist, e.g., as illustrated by the "No" logical path of decision 404, data writes may be performed to the data file, e.g., see operation 412, without having to first perform a merge operation. In contrast, in response to a determination that versions of a data file exist, e.g., as illustrated by the "Yes" logical path of decision 404, method 400 optionally continues to operation 406 for performing a predetermined first data merge process.

In some approaches, the predetermined first data merge process includes determining a file type, e.g., see txt, doc, and ppt, etc., of the data file, e.g., see operation 406. In some approaches, a mapping 414 is accessed to make such a determination.

In some approaches, the file type may not be found and/or another issue may occur that prevents the plugin and/or the merging policy to be determined, e.g., see "Not Found". In response to a determination, method 400 optionally includes storing the versions of the data file to a predetermined database in order to allow another predetermined type of merge process to be performed using the stored versions of the data file to remedy the version conflict.

The mapping is, in some approaches, created between file types and merging plugins. At a system level, method 400 may include adding a plurality of merge functions to a predetermined table 416, and thereafter determining a merging policy to use based on the determined data file type, e.g., see operation 408. In some approaches, content of the predetermined table may be extrapolated from user configuration during creation of the data file.

The plugin with a chosen policy may be called, e.g., see operation 410, to cause the contents of at least one of the versions to be incorporated into the data file. In some approaches, the merging policy is preferably an input parameter of the plugin that is called, which may be determined from a memory module 418 that includes dynamic libraries of plugins associated with merging policies to load. Thereafter a merged file, e.g., that includes determined contents of at least some of the versions of the data file, may be written to the data file. Method 400 optionally ends after the writing is performed to the data file, e.g., see "End." It may be noted that, in the event that the plugin fails to be successfully called, e.g., see "Failed", the different versions of the data file may be stored.

Figure 5:
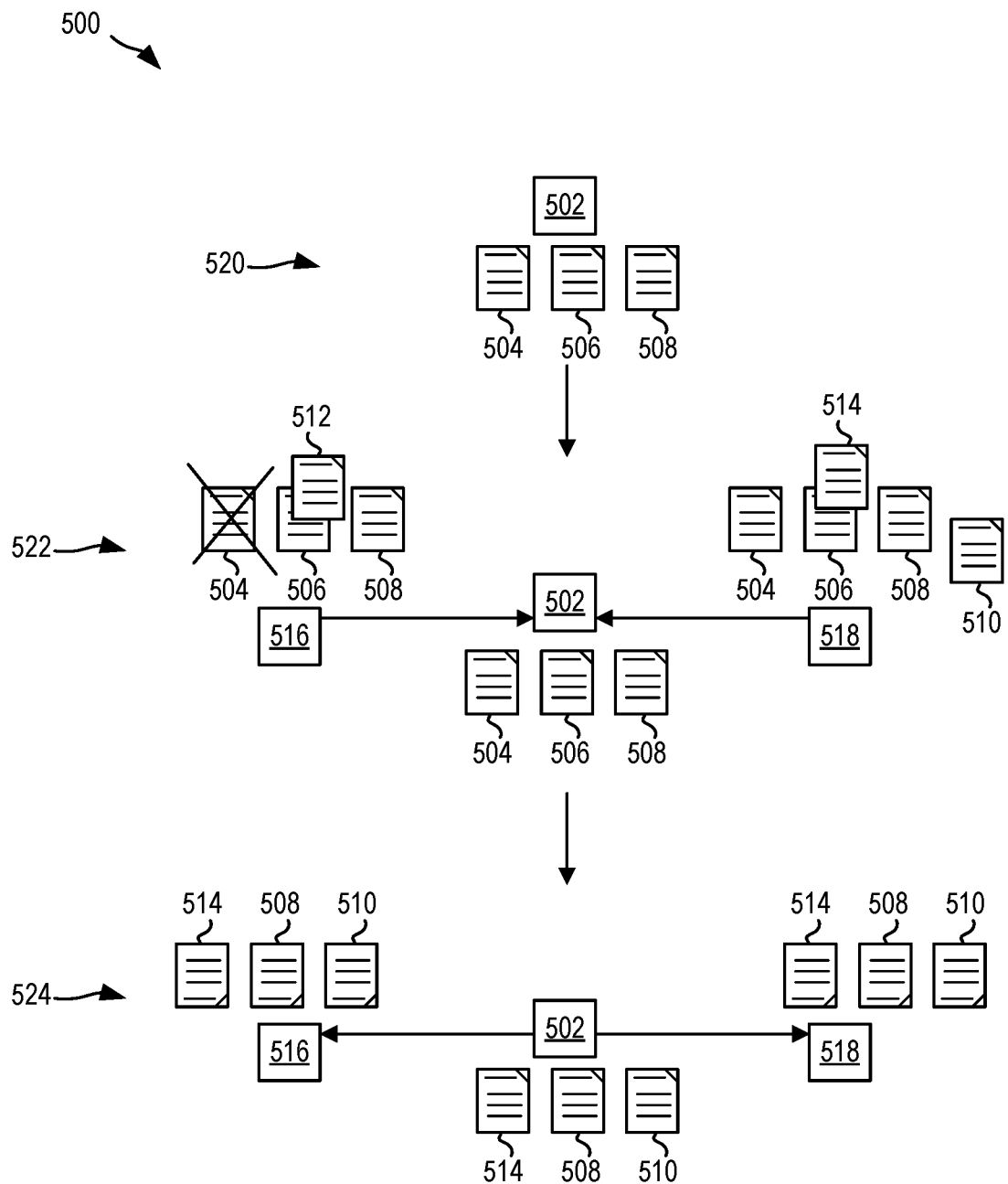
FIG. 5 is a cloud-based environment, in accordance with one approach of the present invention.

FIG. 5 depicts a cloud-based environment 500 in which a content aware predetermined automated first data merge process is being performed, in accordance with one approach. As an option, the present cloud-based environment 500 may be implemented in conjunction with features from any other approach listed herein, such as those described with reference to the other FIGS. Of course, however, such cloud-based environment 500 and others presented herein may be used in various applications and/or in permutations which may or may not be specifically described in the illustrative approaches listed herein. Further, the cloud-based environment 500 presented herein may be used in any desired environment.

In a first stage 520 of the predetermined first data merge process, a data file 502 includes a plurality of pages as contents, e.g., see first page 504, second page 506 and third page 508.

In a second stage 522 of the predetermined first data merge process, a first cloud device 516 edits the first data file. For example, the first cloud device 516 deletes the first page 504 and replaces the second page with a fourth page 512 to form a first version of the data file. Meanwhile, in the second stage 522, a second cloud device 518 replaces the second page with a fifth page 514 and adds a sixth page 510 to form a second version of the data file. A determination may be made that the deletion of the first page 504 by the first cloud device does not create a version conflict with the second version of the data file because the second cloud device does not edit the first page. Furthermore, a determination may be made that the addition of the sixth page 510 by the second cloud device does not create a version conflict with the first version of the data file. However, the edits performed to the second page 506 in each of the versions of the data file do create a version conflict, because they create different versions of the same content. An assumption may be made that the first cloud device replaces the second page with the fourth page 512 at a first timestamp, while the second cloud device replaces the second page with the fifth page 514 at a second timestamp.

A first merging policy associated with a file type of the data file may be determined from a plurality of potential merging policies. Assuming for purposes of an example, that the first merging policy prioritizes relatively more recently performed edits over less recently performed edits, the fifth page 514 is incorporated into a merge operation while the fourth page 512 is excluded from the merge operation. For example, in the third stage 524 of the predetermined first data merge process, the data file 502 is shown to include the fifth page (the changes performed to the data file by the second cloud device at the second timestamp are written into the data file), as well as the third page 508 and the sixth page 510. The updated data file is thereafter accessible, e.g., pushed, to the cloud devices.

FIGS. 6A-6E depict a version conflict scenario 600, in accordance with several approaches. As an option, the present version conflict scenario 600 may be implemented in conjunction with features from any other approach listed herein, such as those described with reference to the other FIGS. Of course, however, such version conflict scenario 600 and others presented herein may be used in various applications and/or in permutations which may or may not be specifically described in the illustrative approaches listed herein. Further, the version conflict scenario 600 presented herein may be used in any desired environment.

Figure 6A:
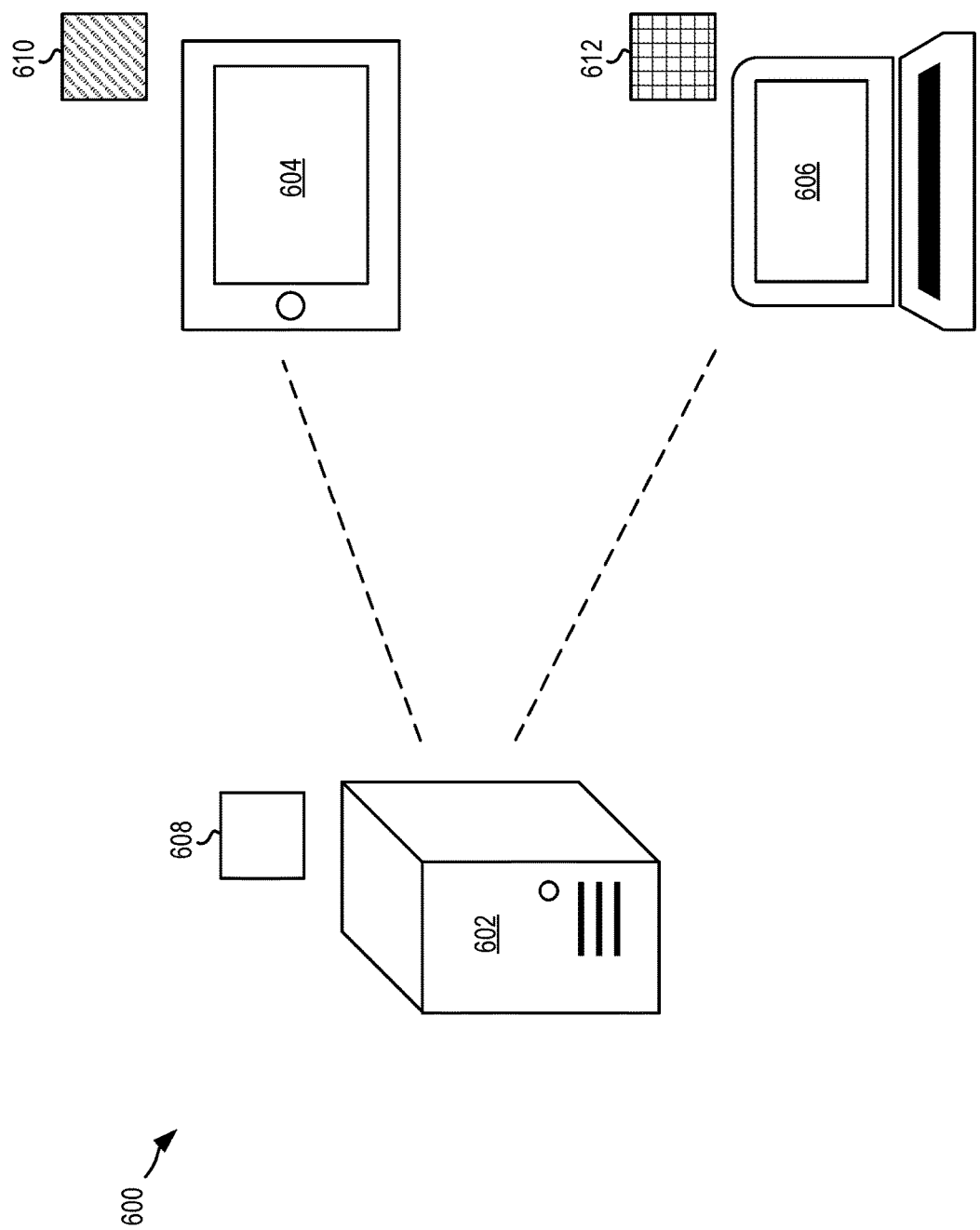
FIGS. 6A-6E depict a version conflict scenario, in accordance with several approaches of the present invention.

Referring first to FIG. 6A, the version conflict scenario 600 includes a synchronization server 602 that stores a first data file 608 that is accessible to a first cloud device 604 and a second cloud device 606. For purposes of the version conflict scenario of FIGS. 6A-6E, it may be assumed that, in an offline state, the first cloud device edits a local copy of the data file at a first timestamp to establish a first version of the data file 610 and the second cloud device edits a local copy of the data file at a second timestamp to establish a second version of the data file 612. Furthermore, an assumption may be made that the first timestamp occurs before the second timestamp. Furthermore, a first role assigned to the cloud device is a root role that is prioritized as a relatively greater role than a second role assigned to the second cloud device which is a user role. Because different versions of the data file exist based on edits performed by the cloud devices in the offline state, a version conflict exists upon the cloud devices attempting to simultaneously upload the different versions to the synchronization server. Various approaches below detail merging policies that may be applied to mitigate the version conflict, e.g., see FIGS. 6B-6E.

Figure 6B:
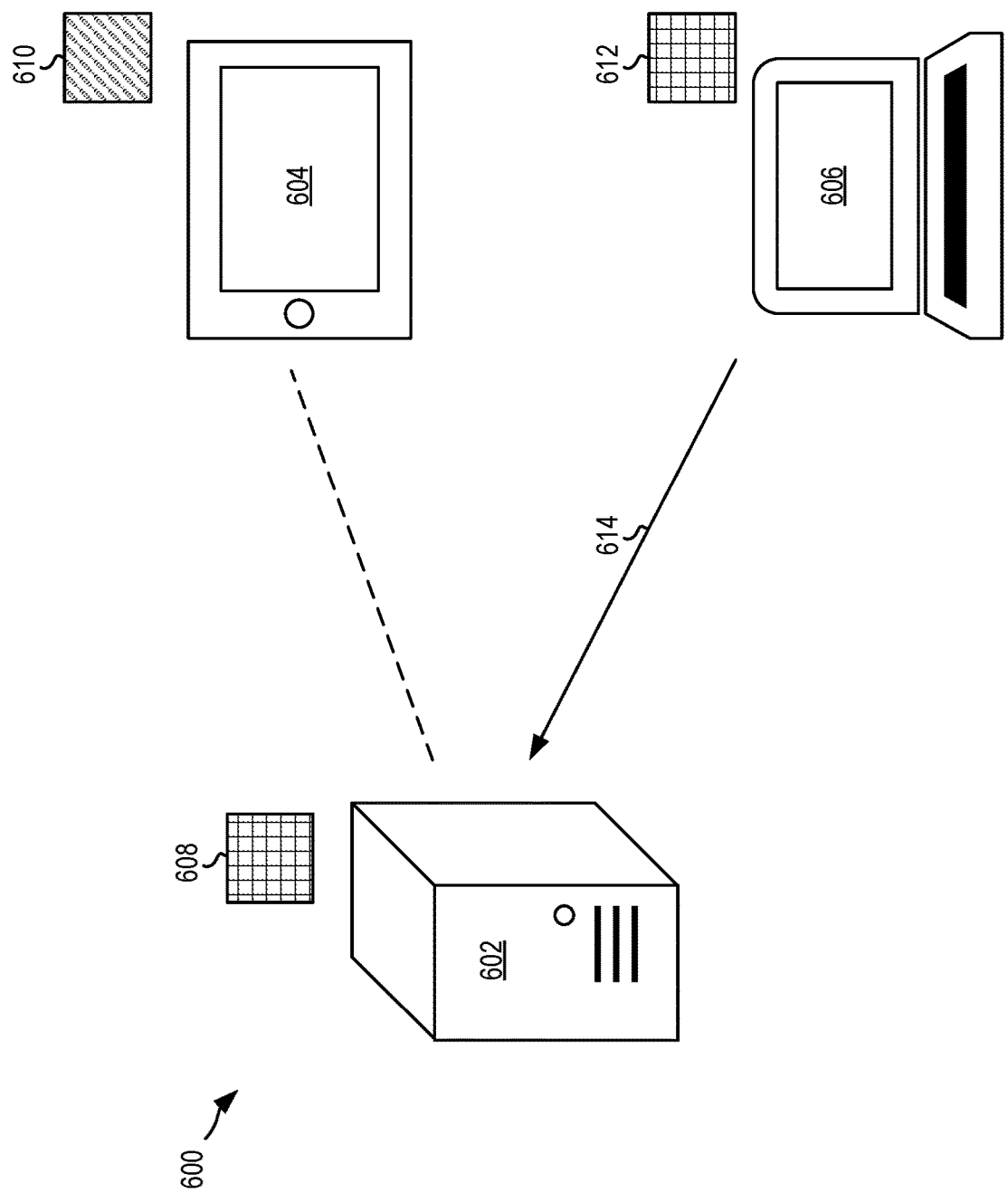
Figure 6C:
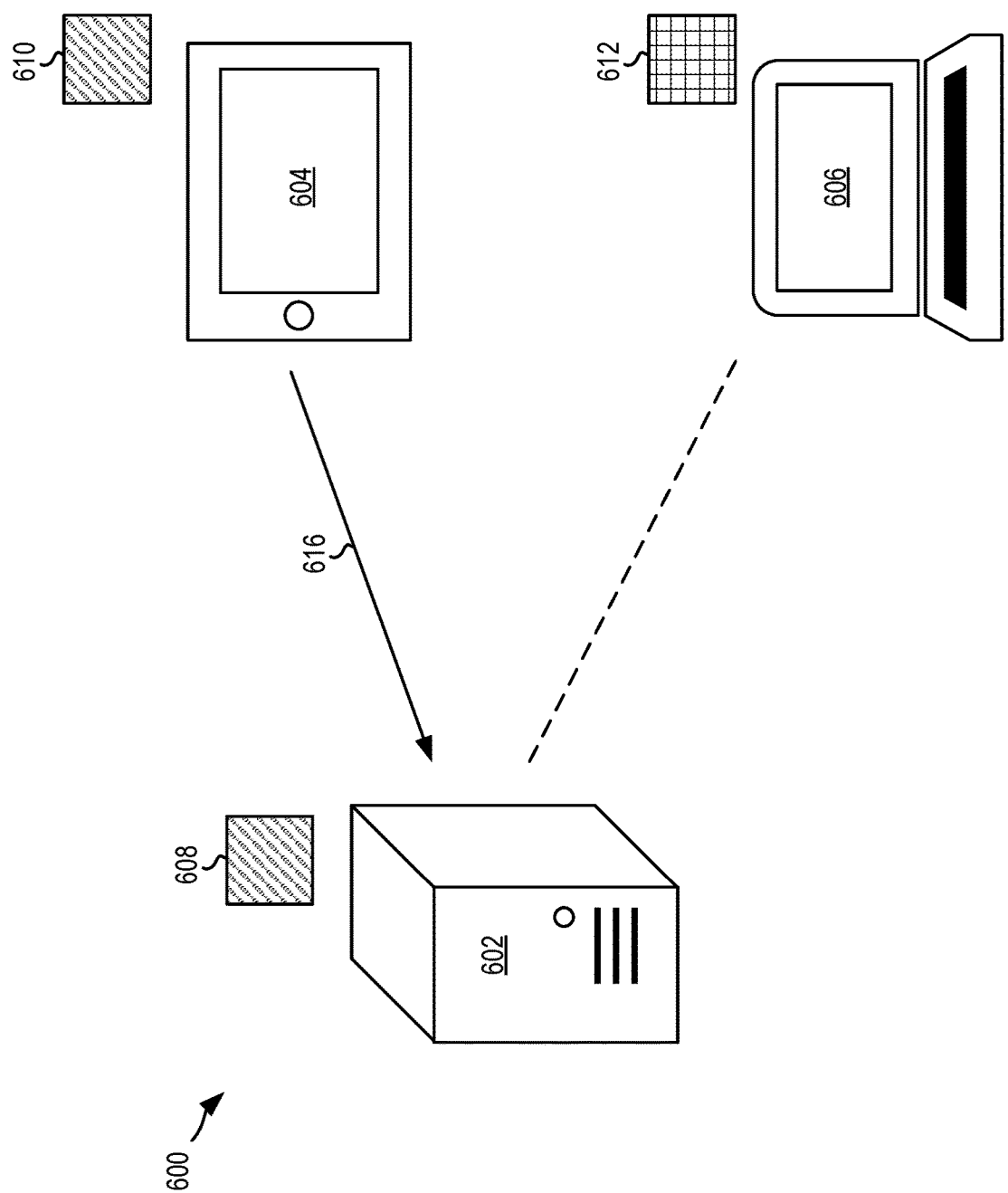

Referring now to FIGS. 6B-6C, a time and role-based merging policy is illustrated in accordance with some approaches. The time and role-based merging policy is applied by determining a timestamp delta, where the timestamp delta is a timestamp difference of the versions of the data file. The timestamp delta is then compared with a predetermined timestamp threshold. The first merging policy is determined to be applicable as a timing-based policy in response to a determination, based on the results of the comparing, that the timestamp delta is greater than the predetermined timestamp threshold. For example, in FIG. 6B, a determination may be made that the timestamp delta is greater than the predetermined threshold, e.g., T2−T1>=threshold. In response to such a determination, the timestamps are considered, and because the second cloud device has a relatively more recent timestamp than the first cloud device, the second version of the data file is incorporated into a merge operation performed on the data file, e.g., see operation 614.

In contrast, referring now to FIG. 6C, a time-and-role based merging policy is configured in response to a determination, based on results of the comparing, that the timestamp delta is less than or equal to the predetermined timestamp threshold, e.g., T2−T1<threshold. In such a case, role-based policy applies. For example, in FIG. 6C, a determination may be made that the role of the first cloud device is greater than the role of the second cloud device. In response to such a determination, the first version of the data file is incorporated into a merge operation performed on the data file, e.g., see operation 616.

Figure 6D:
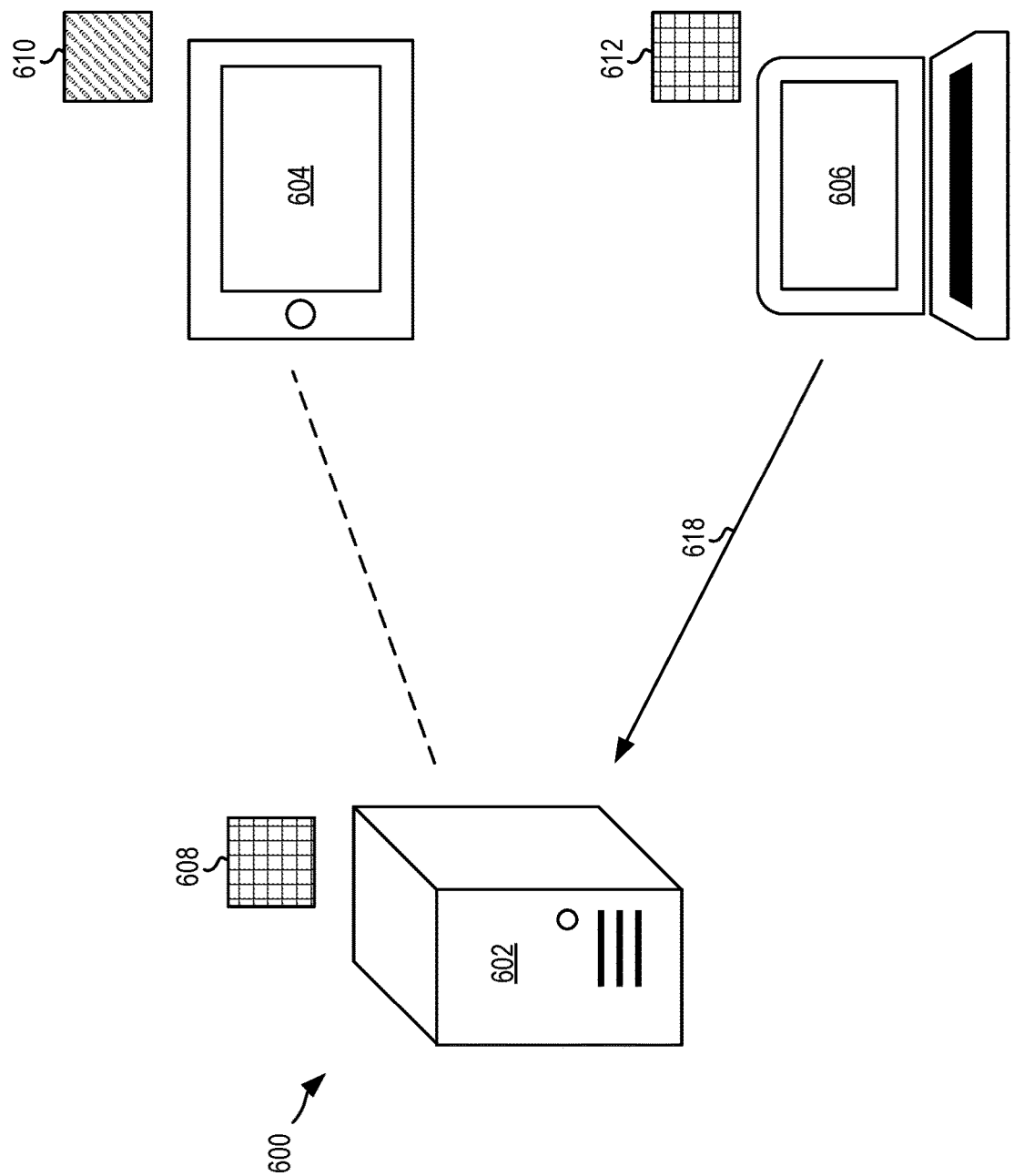

Referring now to FIG. 6D, an assumption may be made that a time-based merging policy is determined to be associated with the data file. Accordingly, because the time-based merging policy prioritizes relatively more recently performed edits over relatively less recently performed edits, the second version of the data file is incorporated into a merge operation performed on the data file, e.g., see operation 618.

Figure 6E:
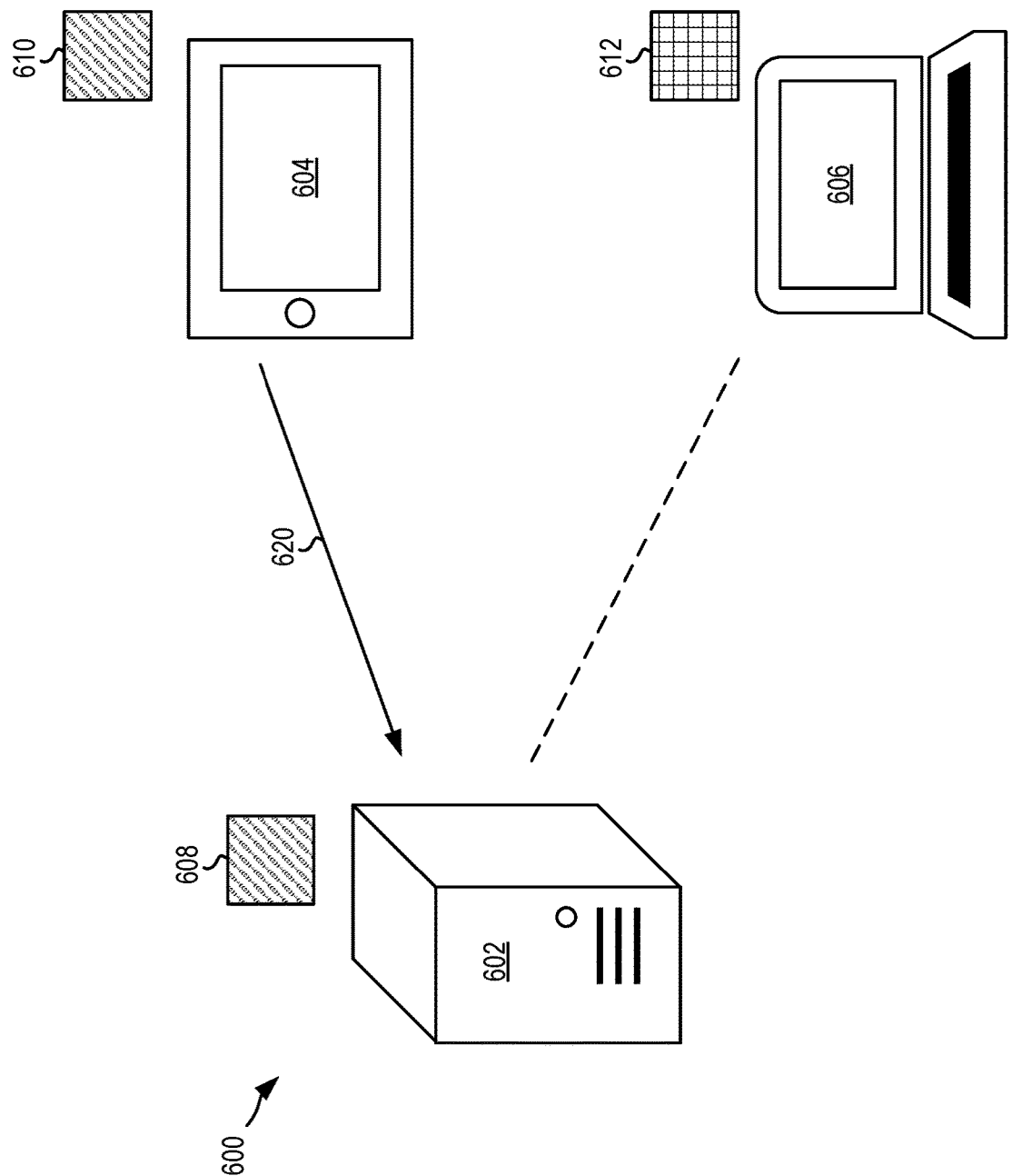

Referring now to FIG. 6E, an assumption may be made that a role-based merging policy is determined to be associated with the data file. Accordingly, because the role-based merging policy prioritizes relatively higher roles over relatively lower roles, the first version of the data file is incorporated into a merge operation performed on the data file, e.g., see operation 620.

Software for performing the methodology of FIG. 3 may be deployed to a management component, e.g., such as a synchronization server on which a data file that is accessible to a plurality of cloud devices is stored, that will perform the method via any known technique. An exemplary process for such deployment is presented immediately below.

Figure 7:
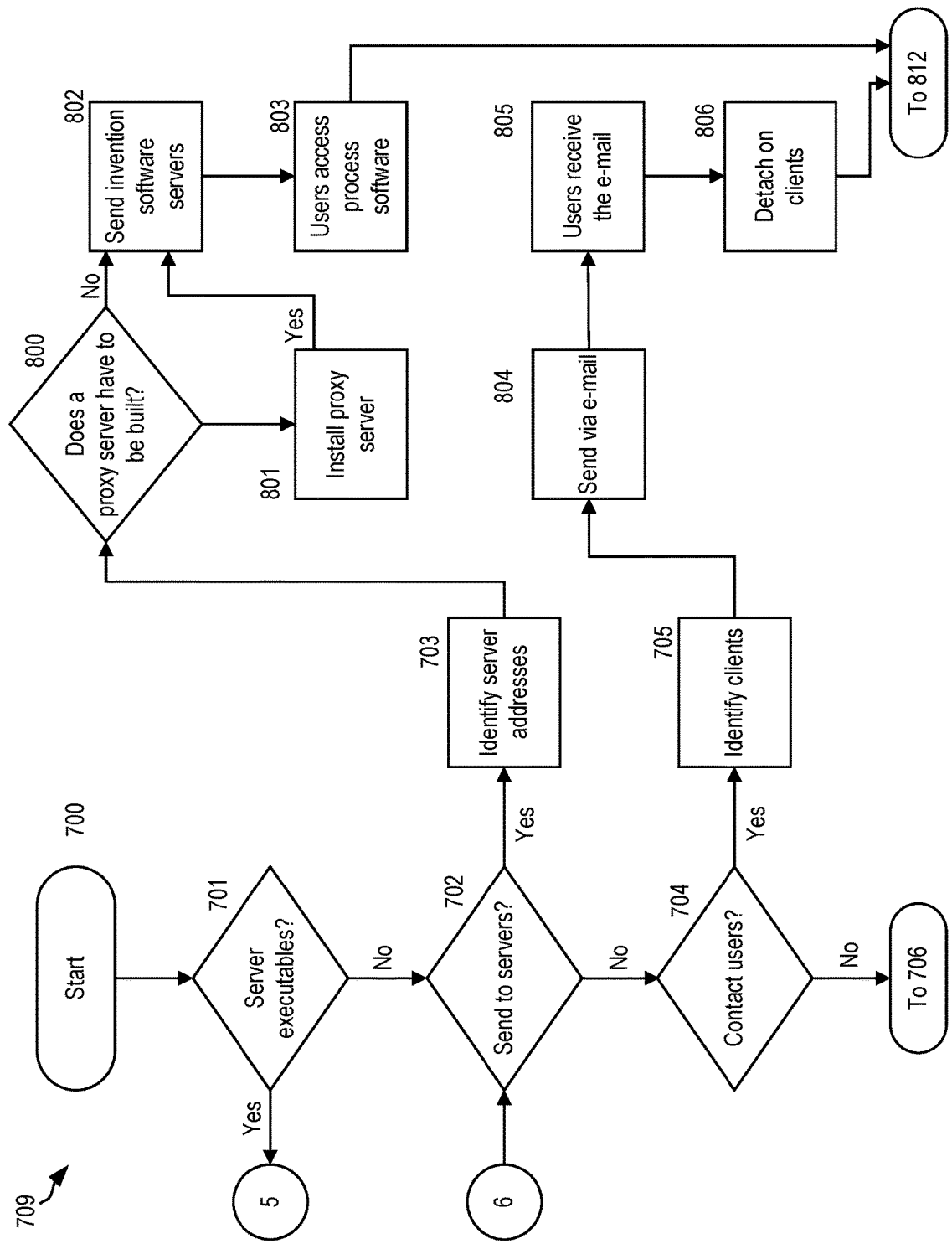
FIG. 7 is a flowchart of a method, in accordance with one approach of the present invention.
Figure 7:
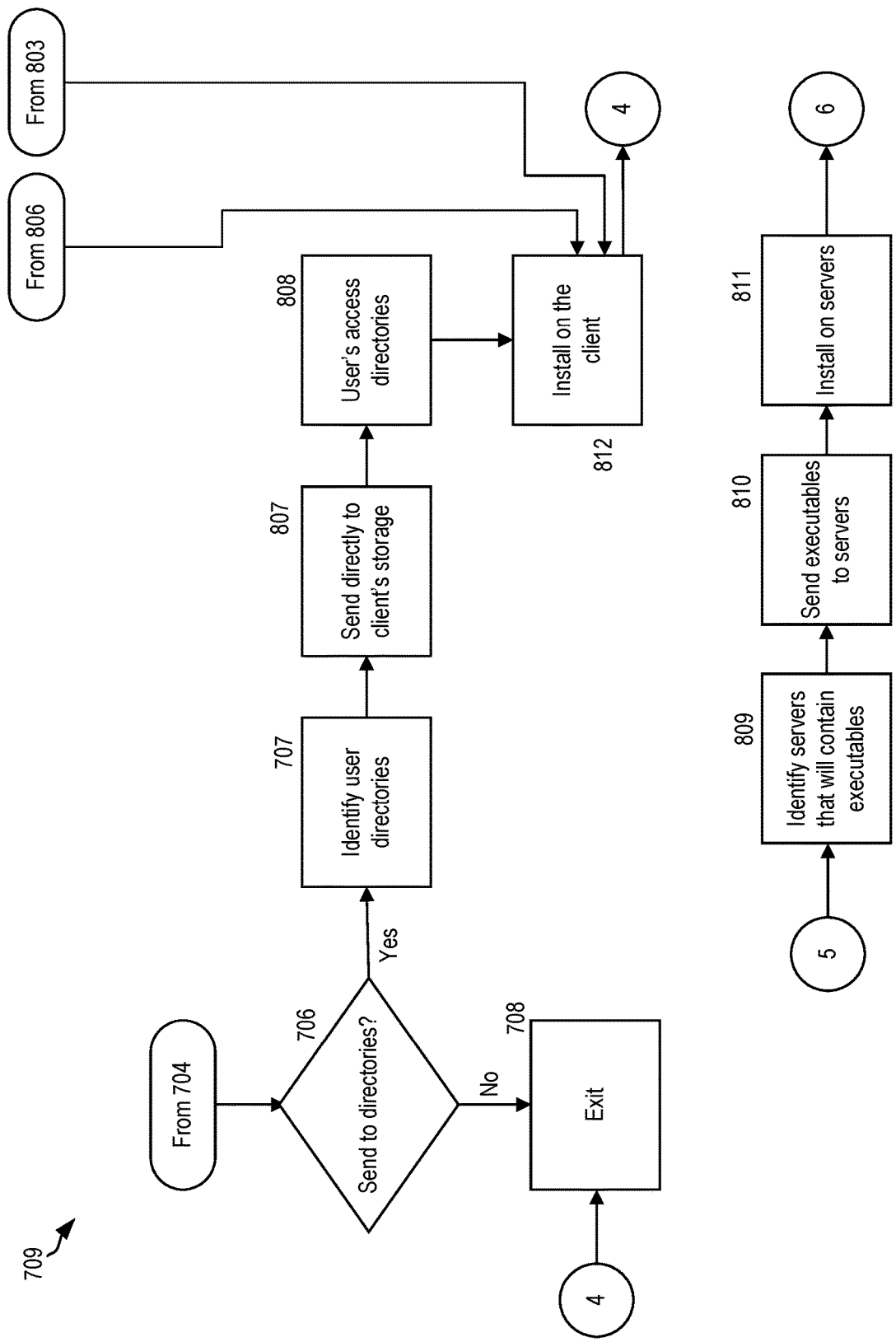

Now referring to FIG. 7, a flowchart of a method 709 is shown according to one approach. The method 709 may be performed in accordance with the present invention in any of the environments depicted in FIGS. 1-7, among others, in various approaches. Of course, more or fewer operations than those specifically described in FIG. 7 may be included in method 709, as would be understood by one of skill in the art upon reading the present descriptions.

Each of the steps of the method 709 may be performed by any suitable component of the operating environment. For example, in various approaches, the method 709 may be partially or entirely performed by a management component, or some other device having one or more processors therein. The processor, e.g., processing circuit(s), chip(s), and/or module(s) implemented in hardware and/or software, and preferably having at least one hardware component, may be utilized in any device to perform one or more steps of the method 709. Illustrative processors include, but are not limited to, a central processing unit (CPU), an application specific integrated circuit (ASIC), a field programmable gate array (FPGA), etc., combinations thereof, or any other suitable computing device known in the art.

While it is understood that the process software for performing a data merge process for mitigating version conflicts may be deployed by manually loading it directly in the client, server, and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Step 700 begins the deployment of the process software. An initial step is to determine if there are any programs that will reside on a server or servers when the process software is executed (701). If this is the case, then the servers that will contain the executables are identified (809). The process software for the server or servers is transferred directly to the servers' storage via FTP or some other protocol or by copying though the use of a shared file system (810). The process software is then installed on the servers (811).

Next, a determination is made on whether the process software is to be deployed by having users access the process software on a server or servers (702). If the users are to access the process software on servers, then the server addresses that will store the process software are identified (703).

A determination is made if a proxy server is to be built (800) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (801). The process software is sent to the (one or more) servers either via a protocol such as FTP, or it is copied directly from the source files to the server files via file sharing (802). Another approach involves sending a transaction to the (one or more) servers that contain the process software, and have the server process the transaction and then receive and copy the process software to the server's file system. Once the process software is stored at the servers, the users via their client computers then access the process software on the servers and copy to their client computers file systems (803). Another approach is to have the servers automatically copy the process software to each client and then run the installation program for the process software at each client computer. The user executes the program that installs the process software on his client computer (812) and then exits the process (708).

In step 704 a determination is made whether the process software is to be deployed by sending the process software to users via e-mail. The set of users where the process software will be deployed are identified together with the addresses of the user client computers (705). The process software is sent via e-mail (804) to each of the users' client computers. The users then receive the e-mail (805) and then detach the process software from the e-mail to a directory on their client computers (806). The user executes the program that installs the process software on his client computer (812) and then exits the process (708).

Lastly, a determination is made on whether the process software will be sent directly to user directories on their client computers (706). If so, the user directories are identified (707). The process software is transferred directly to the user's client computer directory (807). This can be done in several ways such as, but not limited to, sharing the file system directories and then copying from the sender's file system to the recipient user's file system or, alternatively, using a transfer protocol such as File Transfer Protocol (FTP). The users access the directories on their client file systems in preparation for installing the process software (808). The user executes the program that installs the process software on his client computer (812) and then exits the process (708).

It will be clear that the various features of the foregoing systems and/or methodologies may be combined in any way, creating a plurality of combinations from the descriptions presented above.

It will be further appreciated that approaches of the present invention may be provided in the form of a service deployed on behalf of a customer to offer service on demand.

The descriptions of the various approaches of the present invention have been presented for purposes of illustration, but are not intended to be exhaustive or limited to the approaches disclosed. Many modifications and variations will be apparent to those of ordinary skill in the art without departing from the scope and spirit of the described approaches. The terminology used herein was chosen to best explain the principles of the approaches, the practical application or technical improvement over technologies found in the marketplace, or to enable others of ordinary skill in the art to understand the approaches disclosed herein.

What is claimed is:

1. A computer-implemented method, comprising:
   in response to a determination that a version conflict exists between a plurality of versions of a data file resulting from editing performed on different cloud devices, performing a predetermined first data merge process, the predetermined first data merge process including:
      determining a first merging policy of the data file from a plurality of potential merging policies;
      determining a plugin associated with the data file; and
      calling the plugin, wherein the first merging policy is used as an input for the plugin, wherein the plugin includes predetermined conditions for determining first contents of the versions of the data file to exclude from a merge operation performed on the data file and second contents of the versions of the data file to include in the merge operation.

2. The computer-implemented method of claim 1, wherein the merge operation includes writing the second contents to the data file.

3. The computer-implemented method of claim 1, wherein the first merging policy is a timing-based policy.

4. The computer-implemented method of claim 3, wherein a first of the predetermined conditions prioritizes the versions of the data file with relatively more recent changes over the versions of the data file with relatively less recent changes, wherein calling the plugin includes: including the versions of the data file with relatively more recent changes in the merge operation, and excluding the versions of the data file with relatively less recent changes from the merge operation.

5. The computer-implemented method of claim 1, wherein the first merging policy is a role-based policy based on a plurality of predetermined role priorities.

6. The computer-implemented method of claim 5, wherein a first of the predetermined conditions prioritizes the versions of the data file edited by the cloud devices associated with relatively higher role priorities over the versions of the data file edited by cloud devices associated with relatively lower role priorities, wherein determining the first merging policy includes determining the version of the data file edited by the cloud device associated with a relatively highest priority, wherein calling the plugin includes including the version of the data file edited by the cloud device associated with the relatively highest priority in the merge operation.

7. The computer-implemented method of claim 6, wherein roles of the predetermined role priorities are selected from the group consisting of: root, administrator, user, and guest.

8. The computer-implemented method of claim 1, wherein determining the first merging policy includes:
   determining a timestamp delta, wherein the timestamp delta is a timestamp difference of the versions of the data file; and
   comparing the timestamp delta with a predetermined timestamp threshold,
   wherein the first merging policy is determined to be a role-based policy in response to a determination, based on results of the comparing, that the timestamp delta is less than the predetermined timestamp threshold, wherein the first merging policy is determined to be a timing-based policy in response to a determination, based on the results of the comparing, that the timestamp delta is greater than the predetermined timestamp threshold.

9. The computer-implemented method of claim 1, comprising: receiving a request to save the versions of the data file resulting from the editing performed on the different cloud devices; and causing the versions of the data file to be stored on a predetermined storage device.

10. A computer program product, the computer program product comprising a computer readable storage medium having program instructions embodied therewith, the program instructions readable and/or executable by a computer to cause the computer to:
in response to a determination that a version conflict exists between a plurality of versions of a data file resulting from editing performed on different cloud devices, perform a predetermined first data merge process, the predetermined first data merge process including:
determining a first merging policy of the data file from a plurality of potential merging policies;
determining a plugin associated with the data file; and
calling the plugin, wherein the first merging policy is used as an input for the plugin, wherein the plugin includes predetermined conditions for determining first contents of the versions of the data file to exclude from a merge operation performed on the data file and second contents of the versions of the data file to include in the merge operation.

11. The computer program product of claim 10, wherein the merge operation includes writing the second contents to the data file.

12. The computer program product of claim 10, wherein the first merging policy is a timing-based policy.

13. The computer program product of claim 12, wherein a first of the predetermined conditions prioritizes the versions of the data file with relatively more recent changes over the versions of the data file with relatively less recent changes, wherein calling the plugin includes: including the versions of the data file with relatively more recent changes in the merge operation, and excluding the versions of the data file with relatively less recent changes from the merge operation.

14. The computer program product of claim 10, wherein the first merging policy is a role-based policy based on a plurality of predetermined role priorities.

15. The computer program product of claim 14, wherein a first of the predetermined conditions prioritizes the versions of the data file edited by the cloud devices associated with relatively higher role priorities over the versions of the data file edited by cloud devices associated with relatively lower role priorities, wherein determining the first merging policy includes determining the version of the data file edited by the cloud device associated with a relatively highest priority, wherein calling the plugin includes including the version of the data file edited by the cloud device associated with the relatively highest priority in the merge operation.

16. The computer program product of claim 15, wherein roles of the predetermined role priorities are selected from the group consisting of: root, administrator, user, and guest.

17. The computer program product of claim 10, wherein determining the first merging policy includes:
determining a timestamp delta, wherein the timestamp delta is a timestamp difference of the versions of the data file; and
comparing the timestamp delta with a predetermined timestamp threshold,
wherein the first merging policy is determined to be a role-based policy in response to a determination, based on results of the comparing, that the timestamp delta is less than the predetermined timestamp threshold,
wherein the first merging policy is determined to be a timing-based policy in response to a determination, based on the results of the comparing, that the timestamp delta is greater than the predetermined timestamp threshold.

18. The computer program product of claim 10, the program instructions readable and/or executable by the computer to cause the computer to: receive a request to save the versions of the data file resulting from the editing performed on the different cloud devices; and cause the versions of the data file to be stored on a predetermined storage device.

19. A system, comprising:
a processor; and
logic integrated with the processor, executable by the processor, or integrated with and executable by the processor, the logic being configured to:
in response to a determination that a version conflict exists between a plurality of versions of a data file resulting from editing performed on different cloud devices, perform a predetermined first data merge process, the predetermined first data merge process including:
determining a first merging policy of the data file from a plurality of potential merging policies;
determining a plugin associated with the data file; and
calling the plugin, wherein the first merging policy is used as an input for the plugin, wherein the plugin includes predetermined conditions for determining first contents of the versions of the data file to exclude from a merge operation performed on the data file and second contents of the versions of the data file to include in the merge operation.

20. The system of claim 19, wherein the merge operation includes writing the second contents to the data file.

* * * * *